United States Patent
Eberhardt et al.

(10) Patent No.: US 11,240,641 B1
(45) Date of Patent: Feb. 1, 2022

(54) AUTOMATED DEVICE GROUPING

(71) Applicant: Amazon Technologies, Inc., Seattle, WA (US)

(72) Inventors: Sven Eberhardt, Seattle, WA (US); Shekhar Pareek, Sammamish, WA (US); Aniruddha Basak, Seattle, WA (US); Charles Edwin Ashton Brett, Seattle, WA (US); Amir Salimi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/096,357

(22) Filed: Nov. 12, 2020

(51) Int. Cl.
| | |
|---|---|
| H04W 4/08 | (2009.01) |
| H04W 8/00 | (2009.01) |
| H04W 8/18 | (2009.01) |
| H04W 8/22 | (2009.01) |
| H04W 8/26 | (2009.01) |
| H04L 29/08 | (2006.01) |

(52) U.S. Cl.
CPC ............ *H04W 4/08* (2013.01); *H04L 67/306* (2013.01); *H04W 8/005* (2013.01); *H04W 8/18* (2013.01); *H04W 8/22* (2013.01); *H04W 8/26* (2013.01)

(58) Field of Classification Search
CPC ......... H04W 4/08; H04W 8/005; H04W 8/18; H04W 8/22; H04W 8/26; H04L 67/306
See application file for complete search history.

(56) References Cited

U.S. PATENT DOCUMENTS

| | | | | |
|---|---|---|---|---|
| 8,131,875 B1* | 3/2012 | Chen | ................... | H04W 8/24 709/246 |
| 9,648,443 B1* | 5/2017 | Mayron | ............... | H04M 15/715 |
| 9,819,905 B1* | 11/2017 | Breitbard | .............. | H04L 65/601 |
| 10,701,550 B2* | 6/2020 | Park | ..................... | H04W 12/06 |
| 10,764,744 B2* | 9/2020 | Hua | ........................ | H04W 8/12 |
| 10,846,745 B1* | 11/2020 | Meissner | ........... | G06Q 30/0267 |
| 2003/0105862 A1* | 6/2003 | Villavicencio | ........ | H04L 63/168 709/225 |
| 2006/0080415 A1* | 4/2006 | Tu | ....................... | H04L 67/1095 709/220 |
| 2009/0024550 A1* | 1/2009 | Wynn | ................. | H04W 12/069 706/46 |
| 2011/0047603 A1* | 2/2011 | Gordon | ................... | H04L 63/06 726/5 |
| 2011/0319054 A1* | 12/2011 | Cutler | ................... | H04M 15/41 455/406 |

(Continued)

*Primary Examiner* — Dominic E Rego
(74) *Attorney, Agent, or Firm* — Pierce Atwood LLP

(57) ABSTRACT

Techniques for automatically combining devices into a single group of devices, and splitting devices into multiple groups of devices are described. A machine learning model may process device profile data, associated with devices registered to two different users, and determine the devices should be combined into a single group of devices. Such enables a user to control each of the devices, of the two different users, but providing user inputs to a single device of the group. The machine learning model may also process device profile data, associated with devices registered to a single user, and determine the devices should be split into two or more groups of devices. Such may decrease the likelihood that a system may inadvertently control a device not intended by a user.

20 Claims, 11 Drawing Sheets

(56) References Cited

U.S. PATENT DOCUMENTS

| | | | |
|---|---|---|---|
| 2012/0204243 A1* | 8/2012 | Wynn | H04L 63/1475 |
| | | | 726/5 |
| 2014/0122623 A1* | 5/2014 | Nerieri | H04L 67/306 |
| | | | 709/206 |
| 2014/0273847 A1* | 9/2014 | Nixon | G05B 11/01 |
| | | | 455/41.2 |
| 2014/0357229 A1* | 12/2014 | Lee | H04W 4/50 |
| | | | 455/411 |
| 2015/0078357 A1* | 3/2015 | L'Heureux | H04L 67/14 |
| | | | 370/338 |
| 2016/0012460 A1* | 1/2016 | Kruglick | G06Q 30/0207 |
| | | | 705/14.1 |
| 2016/0125471 A1* | 5/2016 | Hsu | G06Q 30/0269 |
| | | | 705/14.66 |
| 2016/0134709 A1* | 5/2016 | Savolainen | H04W 4/80 |
| | | | 370/338 |
| 2016/0182658 A1* | 6/2016 | Allinson | H04L 67/306 |
| | | | 709/224 |
| 2016/0374044 A1* | 12/2016 | Li | H04L 65/1016 |
| 2017/0126811 A1* | 5/2017 | Picciotto | H04L 61/3015 |
| 2017/0353979 A1* | 12/2017 | Lee | H04W 88/04 |
| 2019/0075453 A1* | 3/2019 | Yoon | H04L 63/0823 |
| 2019/0361877 A1* | 11/2019 | Rogynskyy | G06F 7/14 |
| 2020/0267217 A1* | 8/2020 | Defiebre | H04L 67/1059 |
| 2021/0105609 A1* | 4/2021 | Park | H04W 8/205 |
| 2021/0144230 A1* | 5/2021 | Devaraj | H04M 3/42238 |
| 2021/0216265 A1* | 7/2021 | Cansino | H04N 21/43076 |
| 2021/0274312 A1* | 9/2021 | Wolcott | H04W 4/029 |

\* cited by examiner

AUTOMATED DEVICE GROUPING

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
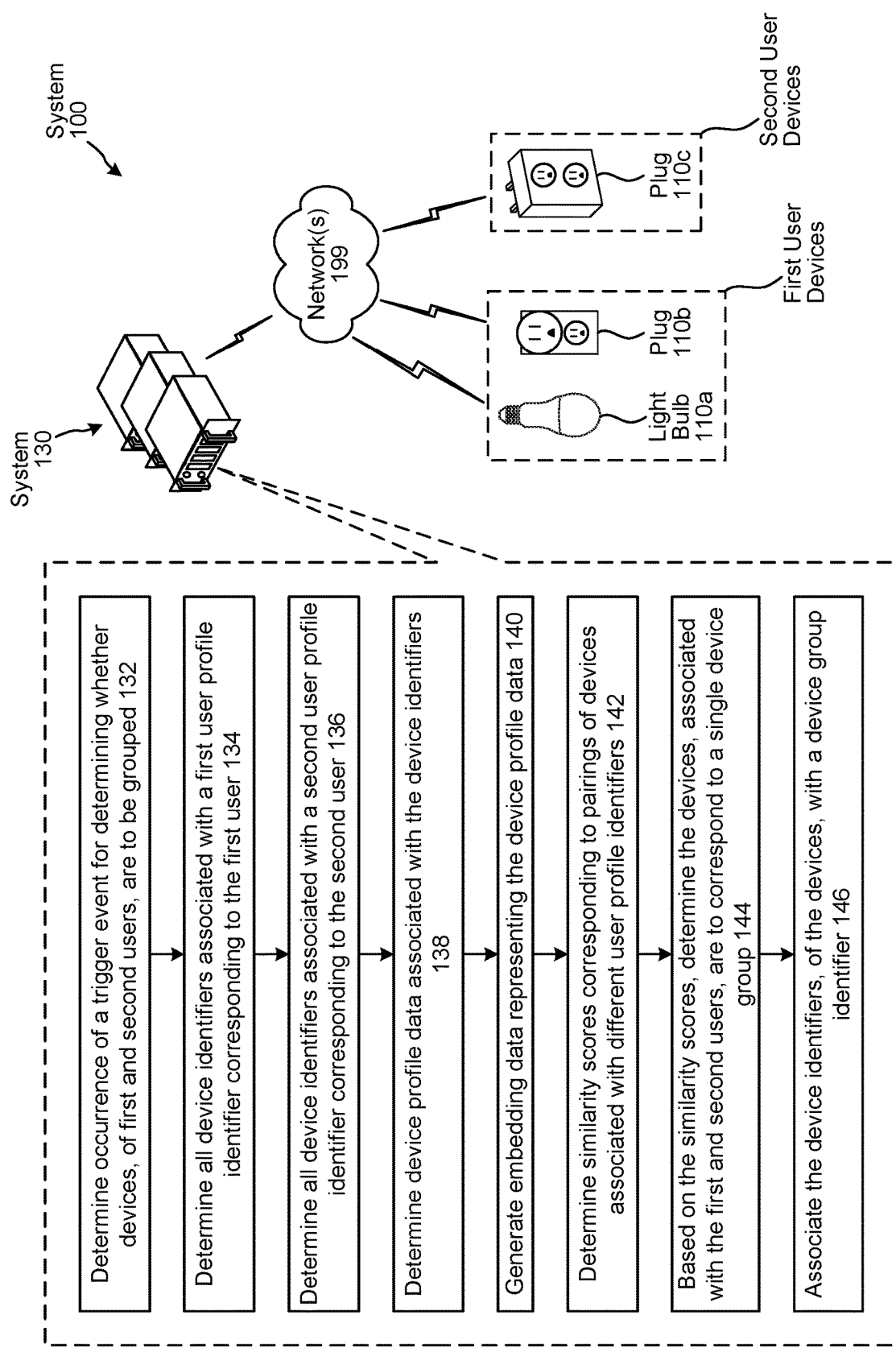
FIG. 1 is a conceptual diagram illustrating a system configured to group devices, according to embodiments of the present disclosure.

A physical location (e.g., a primary residence, a vacation home, a rental property, a hotel, an office, or other physical space, etc.) may include a variety of smart home devices. As used herein, a "smart home device" refers to a computing device that is capable of being controlled using speech, among other things. Example smart home devices include, but are not limited to, light switches, light bulbs, plugs, thermostats, door locks, microwaves, toasters, ovens, coffee makers, faucets, dishwashers, laundry machines (washers and dryers), televisions, and speakers.

A physical location may be associated with multiple users. For example, a primary residence may be associated with occupants of the primary residences, a vacation home may be associated with occupants of the vacation home at a given time, etc. In general, every user of a physical location may be associated with every smart home device of the physical location. For example, a user may be a permanent resident of a physical location, a temporary resident of a physical location (e.g., a renter), a guest of a physical location (e.g., a hotel guest, a guest of the permanent residents of a house), etc.

However, a backend system, configured to control smart home devices in response to user speech, may not associate all smart home devices of a physical location with one another. This may be a result of, for example, different users registering or otherwise associating different smart home devices of a single physical location. For example, a first user of a physical location may register a light bulb and a light switch associated with the physical location, and a second user of the physical location may register a door lock of the physical location. Based on the first and second users registering the different smart home devices, the backend system may associate the smart home devices with the respective user's profile, but the backend system may not associate the smart home devices, registered by the first user, with the smart home devices registered by the second user.

The foregoing may result in a user being unable to control all smart home devices of the physical location by speaking inputs to a single voice-controlled device. For example, the backend system may associate the aforementioned light bulb and light switch with a first speech controllable device of the physical location, and may associate the aforementioned door lock with a second speech controllable device of the physical location. In this example, a user may control the light bulb and/or the light switch by speaking a natural language input to the first speech controllable device, but not the second speech controllable device. Likewise, a user may control the door lock by speaking a natural language input to the second speech controllable device, but not the first speech controllable device.

In addition to the foregoing, a user may register smart home devices, of different physical locations, with the backend system. For example, a user may register a first light bulb, of a primary residence, with the backend system, and may also register a second light bulb, of a vacation home, with the backend system. The user may additionally register a speech controllable device of the primary residence with the backend system. According to the foregoing, if the user says "turn on the light" to the speech controllable device, the backend system may inadvertently turn on the second light bulb when the user intended the first light bulb to be turned on.

The present disclosure relates to automatically grouping devices to be specifically associated with physical locations in which the devices are located. The system may group devices based on similarities in the device profiles of the devices. In some embodiments, the present disclosure describes techniques to detect devices, registered to a single user, that are to be treated as different device groups for purposes of the user experience.

In some embodiments, the system of the present disclosure employs one or more machine learning models to determine which devices are to be associated with the same group and which devices are to be associated with different groups. For example, the machine learning model may be implemented to determine devices to be associated with a primary residence versus devices to be associated with a user's work location, devices to be associated with a primary residence versus devices to be associated with a vacation home, devices to be associated with different units of a rental house, devices to be associated with different suites and/or rooms of a hotel, devices to be associated with different rental properties owned by a single user, devices to be associated with the interior of a residence versus devices to be associated with the exterior of the residence (e.g., patio, pool area, yard, etc.), etc. The machine learning model(s) may continuously determine whether devices of two or more users should be merged into a single device group, or whether devices of a single user should be split into two or more device groups. In this manner, the device groupings may be dynamically updated to reflect any change in circumstances.

Teachings of the present disclosure may be applied to situations in which a first user brings a device (e.g., a tablet, smart phone, speech controllable device, light bulb, etc.) to a physical location associated with one or more devices of a second user. Initially, the first user's device may not be configured to be controlled by speaking a natural language input to a speech controllable device of the second user. Moreover, initially the second user's device(s), associated with the physical location, may not be configured to be controlled by speaking a natural language input to the first user's device. The teachings of the present disclosure may be used to associate the first and second user's devices such that the devices of one user become configured to be controlled by speaking a natural language input to a device of the other user. As specific non-limiting examples, such teachings of the present disclosure may enable a guest of a residence to control devices of the residence by speaking natural language inputs to the guest's device, enable a guest of a hotel to control devices of a hotel room/suite by speaking natural language inputs to the guest's device, enable a user to enter an office conference room (or other room) and control devices of the room by speaking natural language inputs to the guest's device, and the like. Moreover, such teachings would enable, for example, a user, who enters an office conference room to use the user's laptop, tablet, phone, etc. to output audio and/or video associated with the office conference room. It will thus be appreciated that, as a device is moved between different physical locations, the device may transition between different device groups (e.g., a residential device to an office device, a personal device, to a vacation home device; a first room device to a second room device, to a third room device, back to a second room device; etc.).

Various benefits of the present disclosure will become apparent in view of the following detailed description. For example and not limitation, teachings of the present disclosure improve the user experience by allowing a user to provide natural language inputs to a single device of a physical location to control all smart home devices of the physical location. For further example, teachings of the present disclosure improve the user experience by enabling a user to selectively control smart home devices of different physical locations.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to group devices. Although the figures and discussion of the present disclosure illustrate certain steps in a particular order, the steps described may be performed in a different order (as well as certain steps removed or added) without departing from the present disclosure. As shown in FIG. 1, the system 100 may include a system 130 in communication with smart devices across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The system 130 determines (132) occurrence of a trigger event for determining whether devices, of first and second users, are to be grouped. For example, the system 130 may determine a first device identifier, associated with a first user profile identifier, is associated with the same network device (e.g., wireless router) as a second device identifier associated with a second user profile identifier. In other words, the system 130 may determine first and second devices, respectively associated with first and second user profiles, are connected to the same network device (e.g., wireless router). Based thereon, the system 130 may determine processing is to be performed to determine whether devices, associated with the first and second user profile identifiers, are to be grouped so a user can control the devices using a single speech controllable device (or another type of device). For further example, the system 130 may determine a first user spoke a natural language input to control a device associated with a user profile of a second user. In particular, the system 130 may determine a spoken natural language input, associated with a first user profile identifier, includes a device name; determine the device name is not represented in first user profile data associated with the first user profile identifier; determine the device name is represented in second user profile data associated with a second user profile identifier; and based thereon determine processing is to be performed to determine whether devices, associated with the first and second user profile identifiers, are to be grouped so a user can control the devices using a single speech controllable device. In another example, the system 130 may determine a first device identifier, associated with a first user profile identifier, is associated with same or substantially similar GPS coordinates as a second device identifier associated with a second user profile identifier (where the GPS coordinates may indicate that the first device and the second device are located in the same physical location, such as a residence or a hotel room). Based on this determination, the system 130 may determine processing is to be performed to determine whether devices, associated with the first and second user profile identifiers, are to be grouped so a user can control the devices using a single speech controllable device.

After determining the trigger event has occurred, the system 130 determines (134) all device identifiers associated with the first user profile identifier. In the example of FIG. 1, the system 130 may determine the first user profile identifier is associated with a first device identifier, corresponding to a light bulb 110a, and a second device identifier corresponding to a plug 110b.

Moreover, after determining the trigger event has occurred, the system 130 determines (136) all device identifiers associated with the second user profile identifier. In the example of FIG. 1, the system 130 may determine the second user profile identifier is associated with a third device identifier corresponding to a plug 110c.

The system 130 determines (138) device profile data associated with each of the determined device identifiers. In the example of FIG. 1, the system 130 may determine first device profile data associated with the first device identifier, second device profile data associated with the second device identifier, and third device profile data associated with the third device identifier. The device profile data may include various information such as, but not limited to, a user-provided device name, a device type, device input capabilities, device output capabilities, global positioning system (GPS) coordinates, a time zone in which the device is located, a user-defined location of the device (e.g., "home," "kitchen," "living room," "office," "work," "vacation home," etc.), device manufacturer information, and device usage information (e.g., representing times of day in which the device is used, durations of time for which the device is used, etc.).

The system 130 generates (140) embedding data representing the device profile data. In the example of FIG. 1, the system 130 may generate first embedding data representing the first device profile data, second embedding data representing the second device profile data, and third embedding data representing the third device profile data. The system 130 may generate the embedding data using one or more art-known/industry-known embedding techniques. The embedding data may be a data vector representing features learned from the device profile data. In some embodiments, the embedding data may correspond to one of the information included in the device profile data. For example, first embedding data may correspond to a device type in the first device profile data, second embedding data may correspond to a device type in the second device profile data, third embedding data may corresponding to a user-provided device name in the first device profile data, fourth embedding data may correspond to a user-provided device name in the second device profile data, etc.

The system 130 determines (142) similarity scores corresponding to pairings of devices associated with different user profile identifiers, where the similarity scores are based on the respective device embedding data. In at least some embodiments, the system 130 may implement a machine learning model (e.g., a neural network). Embedding data for a pair of devices may be input to the machine learning model, which may generate a similarity score for the pairing of embedding data. In the example of FIG. 1, the machine learning model may generate a first similarity score representing a similarity between the first embedding data representing the first device profile data associated with the first device identifier associated with the first user profile identifier, and the third embedding data representing the third device profile data associated with the third device identifier associated with the second user profile identifier. The machine learning model may also determine a second similarity score representing a similarity between the second embedding data representing the second device profile data associated with the second device identifier associated with the first user profile identifier, and the third embedding data. In at least some embodiments, a similarity score may be a cosine similarity score.

In the example of FIG. 1, the system 130 determines (144), based on the similarity scores, that the devices, associated with the first and second users, are to correspond to a single device group. For example, the system 130 may determine an average similarity score of the determined similarity scores, determine the average similarity score satisfies a condition (e.g., a threshold similarity score), and based thereon determine the devices are to correspond to a single device group. For further example, the system 130 may determine a median similarity score of the determined similarity scores, determine the median similarity score satisfies the condition (e.g., the threshold similarity score), and based thereon may determine the devices are to correspond to a single device group. In another example, the system 130 may implement a machine learning model that is trained using samples including similarity scores corresponding to known groupings of devices. The determined similarity scores may be input to the machine learning model, which may determine whether the devices are to correspond to a single device group.

In response to determining the devices are to correspond to a single device group, the system 130 associates (146) the device identifiers, of the devices, with a device group identifier. In the example of FIG. 1, the system 130 may associate the first device identifier, the second device identifier, and the third device identifier with a device group identifier. A result of such association is that a user may control each of the devices, corresponding to the device identifiers, by providing user inputs (e.g., by speaking or typing a natural language input, performing a gesture, selecting a button, etc.) to a single device of the device group.

Figure 2:
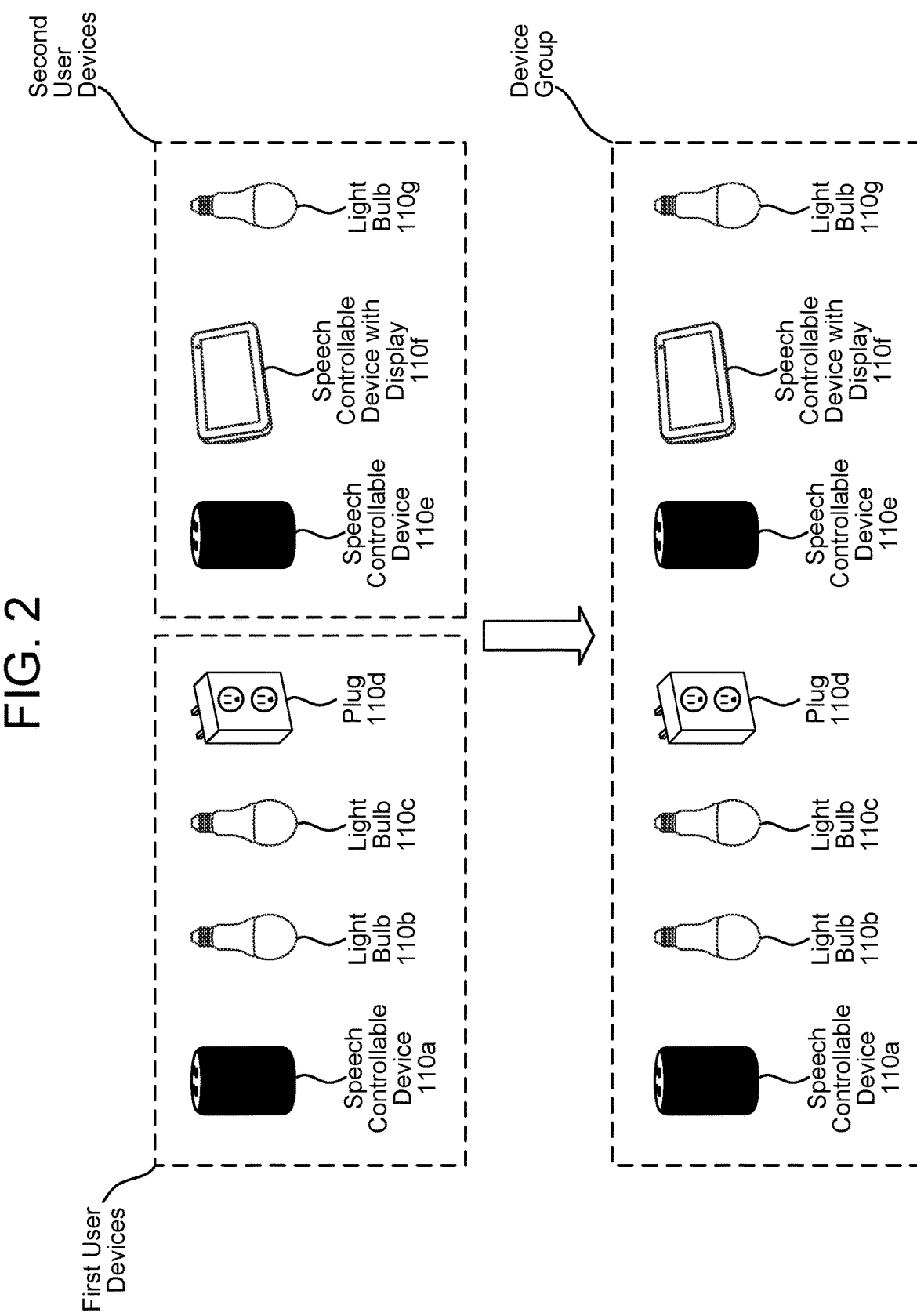
FIG. 2 is a conceptual diagram of how devices, of multiple users, may be combined into a single device group, according to embodiments of the present disclosure.

FIG. 2 conceptually illustrates an example of how the system 130 may combine devices, of multiple users, into a single device group. As illustrated, a first user's profile identifier may be associated with a device identifier corresponding to a speech controllable device 110a, a device identifier corresponding to a light bulb 110b, a device identifier corresponding to a light bulb 110c, and a device identifier corresponding to a plug 110d. Moreover, a second user's profile identifier may be associated with a device identifier corresponding to a speech controllable device 110e, a device identifier corresponding to a speech controllable device 110f including a display, and a device identifier corresponding to a light bulb 110g. The system 130 (e.g., using a machine learning model as described herein below) may process to determine the devices, associated with the first and second user profile identifiers, are to be grouped in a single device grouping. As a result, the system 130 may associate the device identifier corresponding to the speech controllable device 110a, the device identifier corresponding to the light bulb 110b, the device identifier corresponding to the light bulb 110c, the device identifier corresponding to the plug 110d, the device identifier corresponding to the speech controllable device 110e, the device identifier corresponding to the speech controllable device 110f including a display, and the device identifier corresponding to the light bulb 110g with a single device group identifier.

In at least some embodiments, even though the system 130 associates the different devices identifiers with the device group identifier, the system 130 may not associate each of the device identifiers with both the first and second user profile identifiers. In other words, the system 130 may allow the first user profile identifier to remain associated with the device identifier corresponding to the speech controllable device 110a, the device identifier corresponding to the light bulb 110b, the device identifier corresponding to the light bulb 110c, and the device identifier corresponding to the plug 110d; but may not associate the first user profile identifier with the device identifier corresponding to the speech controllable device 110e, the device identifier corresponding to the speech controllable device 110f including a display, and the device identifier corresponding to the light bulb 110g. Moreover, the system 130 may allow the second user profile identifier to remain associated with the device identifier corresponding to the speech controllable device 110e, the device identifier corresponding to the speech controllable device 110f including a display, and the device identifier corresponding to the light bulb 110g; but may not associate the second user profile identifier with the device identifier corresponding to the speech controllable device 110a, the device identifier corresponding to the light bulb 110b, the device identifier corresponding to the light bulb 110c, and the device identifier corresponding to the plug 110d. In at least some other embodiments, when the system 130 associates the different devices identifiers with the device group identifier, the system 130 may associate each of the first and second user profile identifiers with all of the device identifiers associated with the device group identifier.

While FIG. 2 illustrates the grouping of devices respectively associated with two different user profile identifiers, the present disclosure is not limited thereto. The present disclosure also relates to cases where the system 130 processes to group (or not group) various devices associated with two or more different user profile identifiers.

Figure 6:
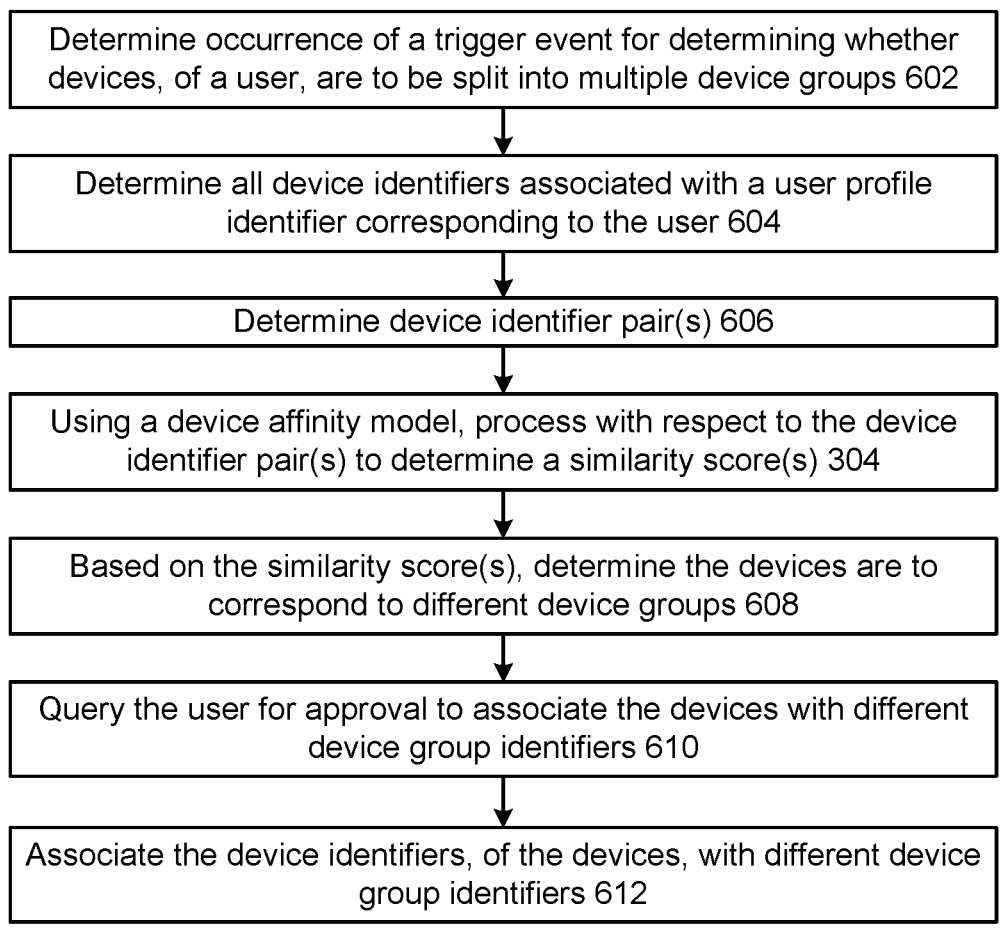
FIG. 6 is a process flow diagram illustrating how a system may determine whether device identifiers, associated with a user profile identifier, are to be associated with different device group identifiers, according to embodiments of the present disclosure.

FIG. 6 illustrates how the system 130 may process to determine whether device identifiers, associated with different user profile identifiers, are to be associated with a single device group identifier. The system 130 may start by determining (132) occurrence of a trigger event. For example, the system 130 may determine a first device identifier, associated with a first user profile identifier, is associated with the same network device (e.g., wireless router) as a second device identifier associated with a second user profile identifier. In other words, the system 130 may determine first and second devices, respectively associated with first and second user profiles, are connected to the same network device. Based thereon, the system 130 may determine processing is to be performed to determine whether devices, associated with the first and second user profile identifiers, are to be associated with a single device group identifier. For further example, the system 130 may determine a first user spoke a natural language input to control a device associated with a user profile of a second user. In particular, the system 130 may determine a spoken natural language input, associated with a first user profile identifier, includes a device name; determine the device name is not represented in first user profile data associated with the first user profile identifier; determine the device name is represented in second user profile data associated with a second user profile identifier; and based thereon determine processing is to be performed to determine whether devices, associated with the first and second user profile identifiers, are to be associated with a single device group identifier. In the foregoing example, the system 130 may determine the second user profile identifier based on the second user profile identifier being associated with location information (e.g., an address) identical or substantially similar to location information associated with the first user profile identifier. In another example, the system 130 may determine a first device identifier, associated with a first user profile identifier, is associated with same or substantially similar GPS coordinates as a second device identifier associated with a second user profile identifier. Based on this determination, the system 130 may determine processing is to be performed to determine whether devices, associated with the first and second user profile identifiers, are to be associated with a single device group identifier. In a further example, the system 130 may determine the foregoing processing is to be performed based on device profile data being changed/updated. By filtering more resource intensive processing to be limited to situations in which a trigger event has occurred, the system 130 may minimize the bandwidth dedicated to performing the more resource intensive processing with respect to devices that are not appropriate for being associated with a single device group identifier.

After determining the trigger event has occurred, the system 130 determines (134) all device identifiers associated with the first user profile identifier. Moreover, after determining the trigger event has occurred, the system 130 determines (136) all device identifiers associated with the second user profile identifier.

The system 130 may thereafter determine (302) one or more pairings of device identifiers. Each device identifier pair may include a device identifier, associated with the first user profile identifier, and a device identifier associated with the second user profile identifier. The system 130 may determine every possible device identifier pair that includes one device identifier, associated with the first user profile identifier, and one device identifier associated with the second user profile identifier. Using FIG. 2 as an example, the system 130 may determine a device pair including a device identifier, corresponding the speech controllable device 110a, and a device identifier corresponding to the speech controllable device 110e; a device pair including a device identifier, corresponding the speech controllable device 110a, and a device identifier corresponding to the speech controllable device 110f including a display; a device pair including a device identifier, corresponding the speech controllable device 110a, and a device identifier corresponding to the light bulb 110g; a device pair including a device identifier, corresponding the light bulb 110b, and a device identifier corresponding to the speech controllable device 110e; a device pair including a device identifier, corresponding the light bulb 110b, and a device identifier corresponding to the speech controllable device 110f including a display; a device pair including a device identifier, corresponding the light bulb 110b, and a device identifier corresponding to the light bulb 110g; a device pair including a device identifier, corresponding the light bulb 110c, and a device identifier corresponding to the speech controllable device 110e; a device pair including a device identifier, corresponding the light bulb 110c, and a device identifier corresponding to the speech controllable device 110f including a display; a device pair including a device identifier, corresponding the light bulb 110c, and a device identifier corresponding to the light bulb 110g; a device pair including a device identifier, corresponding the plug 110d, and a device identifier corresponding to the speech controllable device 110e; a device pair including a device identifier, corresponding the plug 110d, and a device identifier corresponding to the speech controllable device 110f including a display; and a device pair including a device identifier, corresponding the plug 110d, and a device identifier corresponding to the light bulb 110g. In the situation where each of the first and second user profile identifiers are only associated with one device identifier, the system 130 may determine a single device identifier pair including a first device identifier, associated with the first user profile identifier, and a second device identifier associated with the second user profile identifier.

In at least some embodiments, the system 130 may determine device identifier pairs including device identifiers associated with the same user profile identifier. Using FIG. 2 as an example and in addition to the device identifier pairs detailed above, the system 130 may determine a device pair including a device identifier, corresponding the speech controllable device 110a, and a device identifier corresponding to the light bulb 110b; a device pair including a device identifier, corresponding the speech controllable device 110a, and a device identifier corresponding to the light bulb 110c; a device pair including a device identifier, corresponding the speech controllable device 110a, and a device identifier corresponding to the plug 110d; a device pair including a device identifier, corresponding the light bulb 110b, and a device identifier corresponding to the light bulb 110c; a device pair including a device identifier, corresponding the light bulb 110b, and a device identifier corresponding to the plug 110d; a device pair including a device identifier, corresponding the light bulb 110c, and a device identifier corresponding to the plug 110d; a device pair including a device identifier, corresponding the speech controllable device 110e, and a device identifier corresponding to the speech controllable device 110f with a display; a device pair including a device identifier, corresponding the speech controllable device 110e, and a device identifier corresponding to the light bulb 110g; and a device pair including a device identifier, corresponding the speech controllable device 110f with a display, and a device identifier corresponding to the light bulb 110g.

After determining the device identifier pair(s), the system 130 may, using a device affinity model 400, process (304) with respect to the device identifier pair(s) to determine a similarity score(s). Generally, the device affinity model 400 may generate a single similarity score for a single device identifier pair. A similarity score may represent a likelihood that the devices, corresponding to the device identifier pair, should be represented in a same device group (e.g., correspond to the same physical location).

Figure 4:
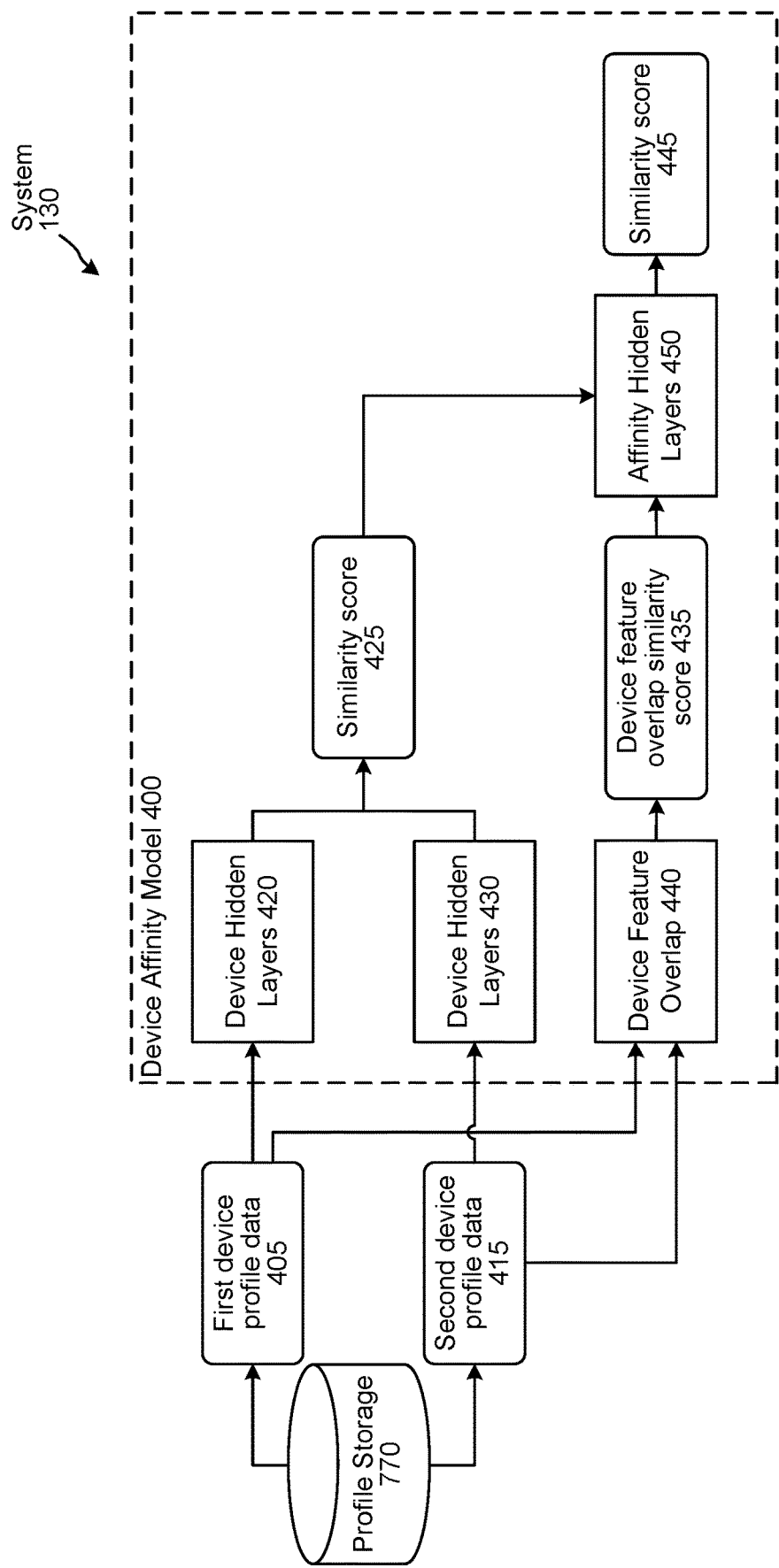
FIG. 4 is a conceptual diagram of a device affinity model, according to embodiments of the present disclosure.

FIG. 4 illustrates an example of how the system 130 may implement the device affinity model 400 to determine whether device identifiers, associated with different user profile identifiers, are to be associated with a same device group identifier, corresponding to a particular physical location such as, for example, a primary residence, a vacation home, a rental property, a hotel, an office, or other physical living space, etc. In at least some embodiments, the device affinity model 400 may be a neural network.

The device affinity model 400 may include device hidden layers 420/430 configured to embed device profile data at runtime. The device hidden layers 420/430 may be trained using positive samples of manually annotated device profile data, with each positive sample including the device profile data of two devices 110 known to belong to a same physical location (e.g., a same building, a same collection of rooms in a building, a same room in a building, etc.). Additionally, the device hidden layers 420/430 may be trained using negative samples of manually annotated device profile data, with each negative sample including the device profile data of two devices 110 known to belong to different physical locations (e.g., different buildings, different collections of rooms in a building, different rooms in a building, etc.). For example, the positive samples may be annotated to be associated with an upper bound (e.g., the integer "1") of cosine similarity scores capable of being generated by the device affinity model 400 at runtime, and the negative samples may be annotated to be associated with a lower bound (e.g., the integer "0") of cosine similarity scores capable of being generated by the device affinity model 400 at runtime. With user permission, the device affinity model 400 may be trained using one or more positive samples corresponding to devices 110 registered to users of the system 130. The device hidden layers 420/430 may be trained as a Siamese network, meaning the device hidden layers 420/430 may be trained to generate, at runtime, similar embeddings for device profile data of two devices 110 corresponding to a same physical location.

The device profile data, used to train the device hidden layers 420/430, may include a variety of information. For example, the device profile data may include a user provided name (e.g., "kitchen A," "living room 1," "John's living room device," "Joe's smart light," etc.), a device type (e.g., light, plug, door lock, speech controllable, dishwasher, thermostat, etc.), one or more device input capabilities (e.g., speech, text, button, gesture, etc.), one or more device output capabilities (e.g., audio, display, haptic, temperature control, etc.), a time zone within which the device 110 is located, geographic location information (e.g., a country, state, city, street, etc. where the device 110 is located), GPS coordinates, a user-defined location of the device (e.g., "home," "kitchen," "living room," "office," "work," "vacation home," etc.), device manufacturer information, and/or device usage information (e.g., representing times of day when the device 110 is controlled by a user, durations of time for which the device is controlled by a user, whether the device is used during the night, whether the device is used when no user is detected to be present, etc.).

The device affinity model 400 may also include a device feature overlap portion 440 configured to determine hard-coded similarities between device features, such as internet protocol (IP) addresses, media access control (MAC) address, etc. IP addresses, MAC addresses, and the like may not be useful because, from a neural network point of view, such address are just random numbers. In other words, there is little to nothing for the neural network to discover from an IP address, MAC address, or the like. Thus, the device feature portion 440 may be trained to IP addresses, MAC addresses, and the like of two different devices, and generate an embedding representing an extent to which the input addresses are the same (e.g., the n first digits of the addresses are the same). The device feature overlap portion 440 is not limited to processing IP and MAC addresses, but rather may be configured to process various numbers (e.g., IP addresses, MAC addresses, physical addresses, zip codes, etc.), represented in device profile data, that a neural network may not be able to glean insight from in and of themselves.

The device affinity model 400 may also include affinity hidden layers 450, which may be a neural network in at least some embodiments. The affinity hidden layers 450 are trained to determine, based on outputs of the device hidden layers 420 and the device feature overlap portion 440, whether the presently being processed pair of devices correspond to a single physical location or different physical locations (e.g., are to correspond to a same device group or different device groups). The affinity hidden layers 450 may be trained using positive samples of outputs of the device hidden layers 420/430 and device feature overlap component 440, with each positive sample corresponding to two devices 110 known to belong to a same physical location/device group. Additionally, the affinity hidden layers 450 may be trained using negative samples of outputs of the device hidden layers 420/430 and device feature overlap component 440, with each negative sample corresponding to two devices 110 known to belong to different physical locations/device groups. For example, the positive samples may be annotated to be associated with an upper bound (e.g., the integer "1") of similarity scores capable of being generated by the device affinity model 400 at runtime, and the negative samples may be annotated to be associated with a lower bound (e.g., the integer "0") of similarity scores capable of being generated by the device affinity model 400 at runtime.

Various machine learning techniques may be used to train and operate the device affinity model 400. Generally, models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model such as the device affinity model 400, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Although the present disclosure describes the device affinity model 400 may trained with respect to device pairs including two devices, the present disclosure is not limited thereto. The present disclosure envisions situations where the device affinity model 400 is trained with respect to device groupings including n devices corresponding to a same physical location, or n different physical locations. Such tuning of the device affinity model 400 is within the scope of one skilled in the art. A resulting device affinity model 400 would be capable of determining a similarity score representing whether n devices, registered to n different users, are to be associated with a same device group or different device groups.

At runtime, the system 130 may receive, from a profile storage 770, first device profile data 405, associated with a first device identifier associated with a first user profile identifier, and second device profile data 415 associated with a second device identifier associated with a second user profile identifier. In at least some embodiments, the profile storage 770 may be implemented by the system 130. In at least some other embodiments, the profile storage 770 may be implemented by a system 120 separated from but in communication with the system 130, for example by a network(s).

The first device profile data 405 and the second device profile data 415 are input to the device hidden layers 420 and the device hidden layers 430, respectively. The device hidden layers 420 generate first embedding data representing the first device profile data, and the device hidden layers generate second embedding data representing the second device profile data 415. As indicated above, the device hidden layers 420/430 may operate as a Siamese network. Thus, the device hidden layers 420/430 may work in conjunction to determine a similarity score 425 representing a similarity between the first embedding data and the second embedding data. The similarity score may be a cosine similarity score, a dot product, a mean square distance, or other type of similarity score.

The first device profile data 405 and the second device profile data 415 may also be input to the device feature overlap component 440. The device feature overlap component 440 processes the first device profile data 405 and the second device profile data 415 to determine a device feature overlap similarity score 435 representing, for example, a similarity between a first IP address, in the first device profile data 405, and a second IP address in the second device profile data 415, a similarity between a first MAC address, in the first device profile data 405, and a second MAC address in the second device profile data 415; and/or a similarity between a first physical address, in the first device profile data 405, and a second physical address in the second device profile data 415.

The similarity score 425 and the device feature overlap similarity score 435 may be input to the affinity hidden layers 450. The affinity hidden layers 450 process the similarity score 425 and the device feature overlap similarity score 435 to determine a similarity score 445 representing a likelihood that the first and second devices, corresponding to the first and second device profile data 405/415, correspond to a same physical location. In other words, the similarity score 445 may represent a likelihood that first and second device identifiers, corresponding to the first and second device profile data 405/415, are to be associated with a same device group identifier. The similarity score 445 may be a number (e.g., between 0 and 1) or a binned score (e.g., low, medium, high).

The device affinity model 400 may perform the above processing with respect to device profile data corresponding to each device identifier pair determined at step 302. Such may prevent the situation where processing of a single device pair results in a false positive.

Figure 3:
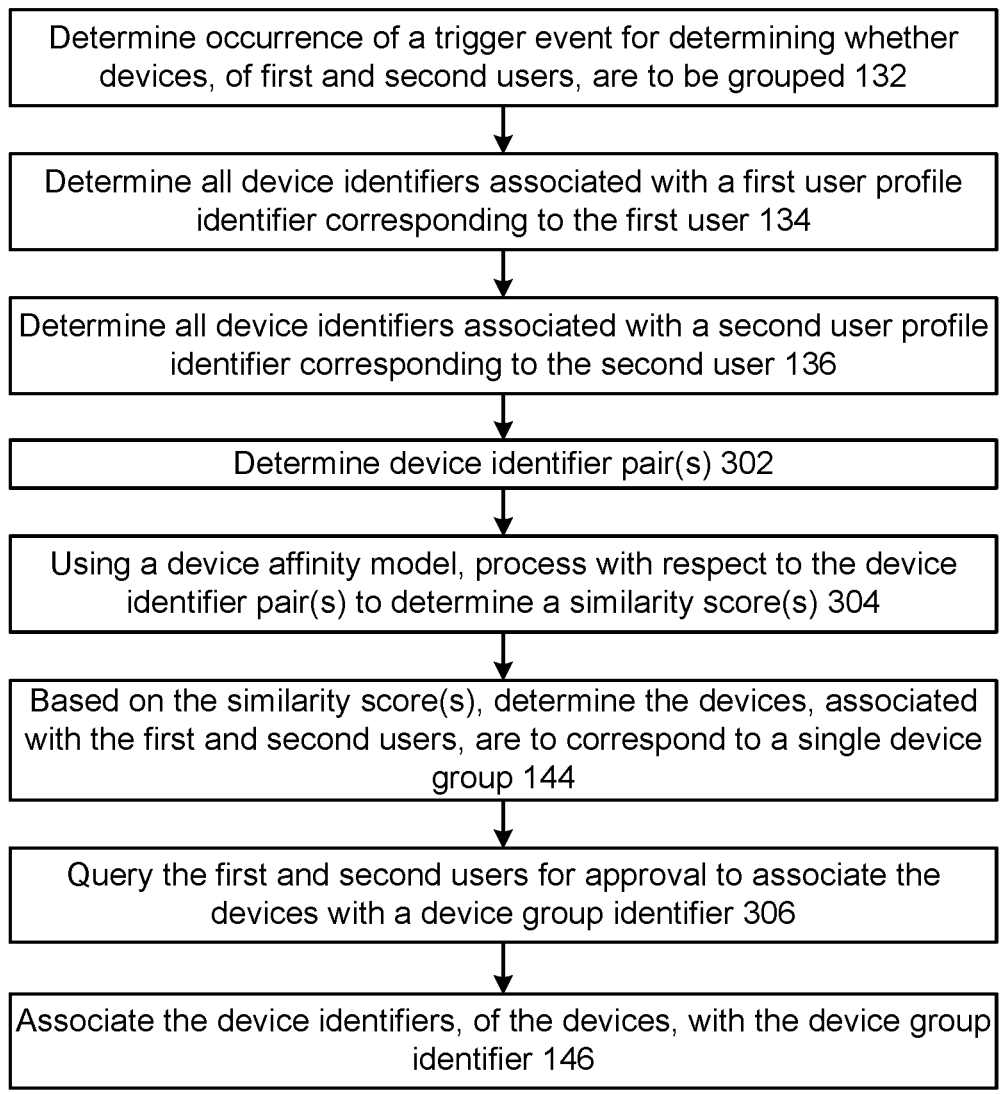
FIG. 3 is a process flow diagram illustrating how a system may determine whether device identifiers, associated with different user profile identifiers, are to be associated with a device group identifier, according to embodiments of the present disclosure.

Referring again to FIG. 3, after the system 130 generates the similarity score(s), the system 130 may, based on the similarity score(s), determine (144) the devices, associated with the first and second users, are to correspond to a single device group. In other words, based on the similarity score(s), the system 130 may determine the device identifiers, corresponding to the devices, are to be associated with a single device group identifier. In general, the system 130 may make this determination across all devices of the two different users, not just a single device pair that was processed. For example, the system 130 may determine an average similarity score of the determined similarity scores, determine the average similarity score satisfies a condition (e.g., a threshold similarity score), and based thereon determine the devices are to correspond to a single device group. For further example, the system 130 may determine a median similarity score of the determined similarity scores, determine the median similarity score satisfies the condition (e.g., the threshold similarity score), and based thereon may determine the devices are to correspond to a single device group. In another example, the system 130 may determine a percentile of the distribution of similarity scores, determine the percentile satisfied a condition, and based thereon determine the devices are to correspond to a single device group. For further example, the system 130 may implement a machine learning model trained using samples including similarity scores corresponding to known device groups. The determined similarity scores may be input to the machine learning model, which may determine whether the devices are to correspond to a single device group.

After determining the devices are to correspond to a single device group, the system 130 may query (306) the first and second users for approval to associate the devices with a single device group identifier. For example, the system 130 may cause a first device 110, of the first user, to output audio corresponding to synthesized speech and/or display natural language text requesting approval to associate the devices with a single device group identifier; and may cause a second device 110, of the second user, to output audio corresponding to synthesized speech and/or display natural language text requesting approval to associate the devices with a single device group identifier. The first and second users may indicate their approval by speaking a natural language input, typing a natural language input, performing a gesture, interacting with a physical or displayed button, etc. Upon receiving approval from both the first and second users, the system 130 may associate (146) the device identifiers, of the devices of the first and second users, with a single device group identifier. Such enables a user to control all of the device by providing an input to one of the devices.

In some instances, the first user's profile identifier may be associated with an indicator representing the first user is authorized to make decisions on behalf of the second user. For example, the first user's profile identifier may be associated with an indicator representing the first user is a parent or other type of guardian of the second user. In such situations, the system 130 may request and receive approval from only the first user.

Figure 5:
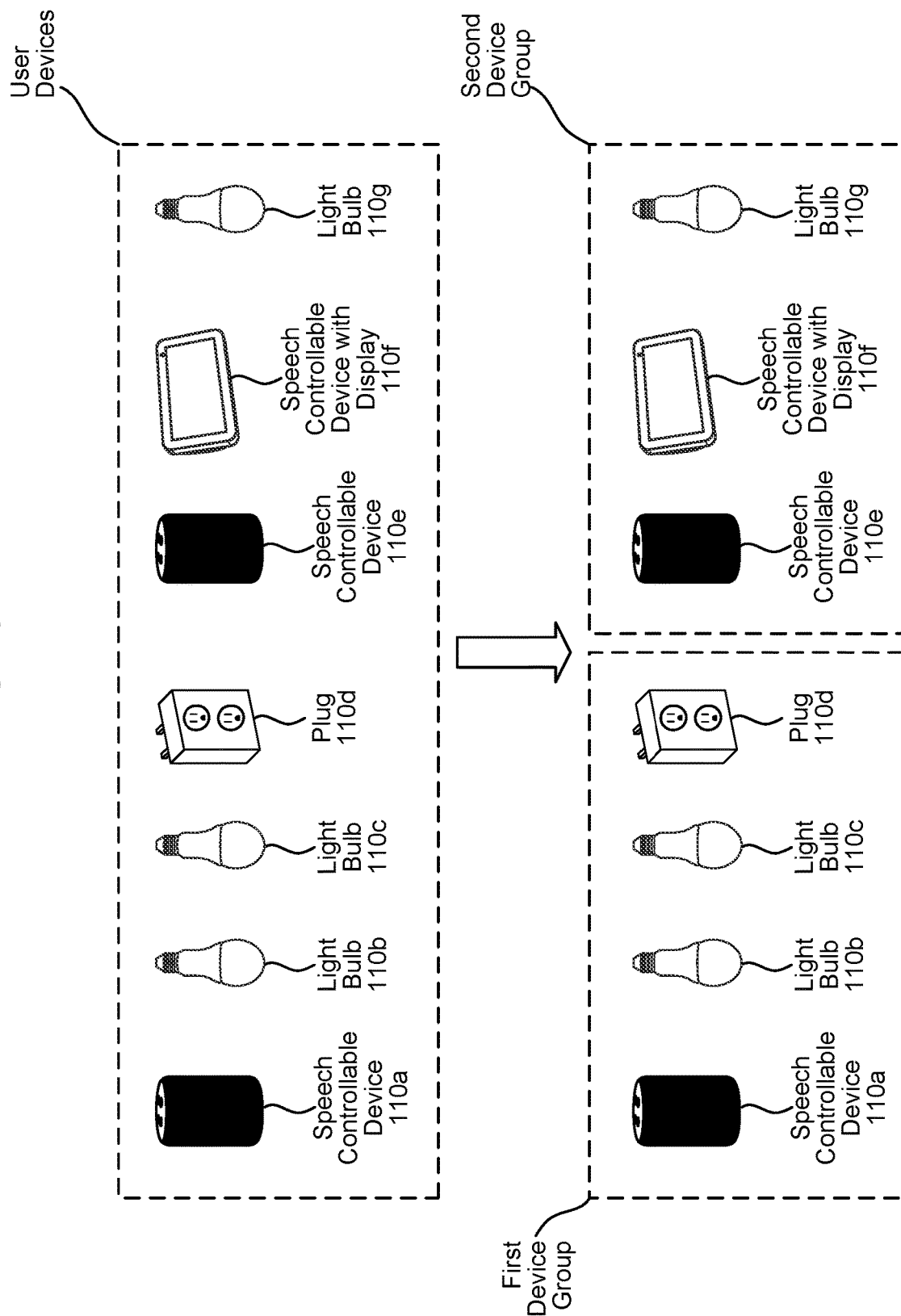
FIG. 5 is a conceptual diagram of how devices, of a user, may be split into multiple device groups, according to embodiments of the present disclosure.

The foregoing describes how the system 130 may process to combine devices, associated with different users, into a single device group. FIG. 5 conceptually illustrates an example of how the system 130 may split devices, of a single user, into multiple device groups. As illustrated, a user's profile identifier may be associated with a device identifier corresponding to a speech controllable device 110a, a device identifier corresponding to a light bulb 110b, a device identifier corresponding to a light bulb 110c, a device identifier corresponding to a plug 110d, a device identifier corresponding to a speech controllable device 110e, a device identifier corresponding to a speech controllable device 110f including a display, and a device identifier corresponding to a light bulb 110g. The system 130 (e.g., using a machine learning model as described herein below) may process to determine the devices, associated with the user profile identifier, are to be split into two different device groups. As a result, the system 130 may associate the device identifier corresponding to the speech controllable device 110a, the device identifier corresponding to the light bulb 110b, the device identifier corresponding to the light bulb 110c, and the device identifier corresponding to the plug 110d with a first device group identifier; and may also associate the device identifier corresponding to the speech controllable device 110e, the device identifier corresponding to the speech controllable device 110f including a display, and the device identifier corresponding to the light bulb 110g with a second device group identifier. Even though the system 130 associates the devices identifiers with different device group identifiers, the system 130 may leave all of the device identifiers associated with the single user profile identifier.

While FIG. 5 illustrates devices, associated with a user profile identifier, being split into two device groups, the present disclosure is not limited thereto. The present disclosure envisions situations where the system 130 processes to split devices, associated with a user profile identifier, into two or more different device groups.

FIG. 6 illustrates how the system 130 may process to determine whether device identifiers, associated with a single user profile identifier, are to be associated with different device group identifiers. The system 130 may start by determining (602) occurrence of a trigger event. For example, the system 130 may determine two device identifiers, associated with the same user profile identifier, are associated with two unassociated network devices (e.g., two unassociated wireless routers). Based thereon, the system 130 may determine processing is to be performed to determine whether devices, associated with the user profile identifier, are to be associated with different device group identifiers. For further example, the system 130 may determine a device identifier has newly been associated with a user profile identifier (e.g., due to a device newly being registered to a user). Based thereon, the system 130 may determine processing is to be performed to determine whether devices, associated with the user profile identifier, are to be associated with different device group identifiers. In another example, the system 130 may determine two device identifiers, associated with a user profile identifier, are associated with substantially different GPS coordinates. Based on this determination, the system 130 may determine processing is to be performed to determine whether devices, associated with the user profile identifier, are to be associated with different device group identifiers. By filtering more resource intensive processing to be limited to situations in which a trigger event has occurred, the system 130 may minimize the bandwidth dedicated to performing the more resource intensive processing with respect to devices that are not appropriate for being associated with different device group identifiers.

After determining the trigger event has occurred, the system 130 determines (604) all device identifiers associated with the user profile identifier. The system 130 may thereafter determine (606) one or more pairings of device identifiers. The system 130 may determine every possible device identifier pair. Using FIG. 5 as an example, the system 130 may determine a device pair including a device identifier, corresponding the speech controllable device 110a, and a device identifier corresponding to the light bulb 110b; a device pair including a device identifier, corresponding the speech controllable device 110a, and a device identifier corresponding to the light bulb 110c; a device pair including a device identifier, corresponding the speech controllable device 110a, and a device identifier corresponding to the plug 110d; a device pair including a device identifier, corresponding the speech controllable device 110a, and a device identifier corresponding to the speech controllable device 110e; a device pair including a device identifier, corresponding the speech controllable device 110a, and a device identifier corresponding to the speech controllable device 110f with a display; a device pair including a device identifier, corresponding the speech controllable device 110a, and a device identifier corresponding to the light bulb 110g; a device pair including a device identifier, corresponding the light bulb 110b, and a device identifier corresponding to the light bulb 110c; a device pair including a device identifier, corresponding the light bulb 110b, and a device identifier corresponding to the plug 110d; a device pair including a device identifier, corresponding the light bulb 110b, and a device identifier corresponding to the speech controllable device 110e; a device pair including a device identifier, corresponding the light bulb 110b, and a device identifier corresponding to the speech controllable device 110f with a display; a device pair including a device identifier, corresponding the light bulb 110b, and a device identifier corresponding to the light bulb 110g; a device pair including a device identifier, corresponding the light bulb 110c, and a device identifier corresponding to the plug 110d; a device pair including a device identifier, corresponding the light bulb 110c, and a device identifier corresponding to the speech controllable device 110e; a device pair including a device identifier, corresponding the light bulb 110c, and a device identifier corresponding to the speech controllable device 110f with a display; a device pair including a device identifier, corresponding the light bulb 110c, and a device identifier corresponding to the light bulb 110g; a device pair including a device identifier, corresponding the plug 110d, and a device identifier corresponding to the speech controllable device 110e; a device pair including a device identifier, corresponding the plug 110d, and a device identifier corresponding to the speech controllable device 110f including a display; a device pair including a device identifier, corresponding the plug 110d, and a device identifier corresponding to the light bulb 110g; a device pair including a device identifier, corresponding the speech controllable device 110e, and a device identifier corresponding to the speech controllable device 110f with a display; a device pair including a device identifier, corresponding the speech controllable device 110e, and a device identifier corresponding to the light bulb 110g; and a device pair including a device identifier, corresponding the speech controllable device 110f with a display, and a device identifier corresponding to the light bulb 110g.

After determining the device identifier pair(s), the system 130 may, using the device affinity model 400, process (304) with respect to the device identifier pair(s) (as described herein above) to determine a similarity score(s). Based on the similarity score(s), the system 130 may determine (608) the devices, associated with the single user, are to correspond to different device groups. In other words, based on the similarity score(s), the system 130 may determine the device identifiers, corresponding to the devices, are to be associated with different device group identifiers. In general, the system 130 may make this determination across all devices of the user, not just a single device pair that was processed. For example, the system 130 may implement a machine learning model trained using samples including similarity score distributions corresponding to known situations of a single user's devices corresponding to different device groups/physical locations. The determined similarity scores may be input to the machine learning model, which may determine whether the devices are to correspond to different device groups. For example, if the device affinity model 400 outputs a bimodal distribution of similarity scores, the foregoing machine learning model may determine the devices are to be split into two device groups.

After determining the devices are to correspond to multiple device groups, the system 130 may query (610) the user for approval to associate the devices with different device group identifiers. For example, the system 130 may cause a device, of the user, to output audio corresponding to synthesized speech and/or display natural language text requesting approval to associate the devices with different device group identifiers. The user may indicate the user's approval by speaking a natural language input, typing a natural language input, performing a gesture, interacting with a physical or displayed button, etc. Upon receiving approval from the user, the system 130 may associate (612) the device identifiers, of the devices of the user, with different device identifiers. For example and with reference to FIG. 5, the system 130 may associate device identifiers of the speech controllable device 110a, the light bulb 110b, the light bulb 110c, and the plug 110d with a first device group identifier; and may associate device identifiers of the speech controllable device 110e, the speech controllable device 110f with a display, and the light bulb 110g with a second device group identifier. Such enables a user to only control devices of a group by providing an input to one of the devices of the group.

The foregoing processing of the device affinity model 400 may be performed to dynamically update device groups to reflect changes in circumstances. For example, a hotel room may initially include a speech controllable device and a light bulb. Thereafter, a guest of the hotel may insert a plug into an outlet of the hotel room. When this happens, the speech controllable device, the light bulb, and the plug may be represented by the system 130 as a single device group, thereby allowing the user to control the light bulb and the plug using the speech controllable device. When the user's stay at the hotel is over, the user may remove the plug from the outlet. In response, the plug may be removed from the device group, leaving the speech controllable device and the light bulb in the device group.

Figure 7:
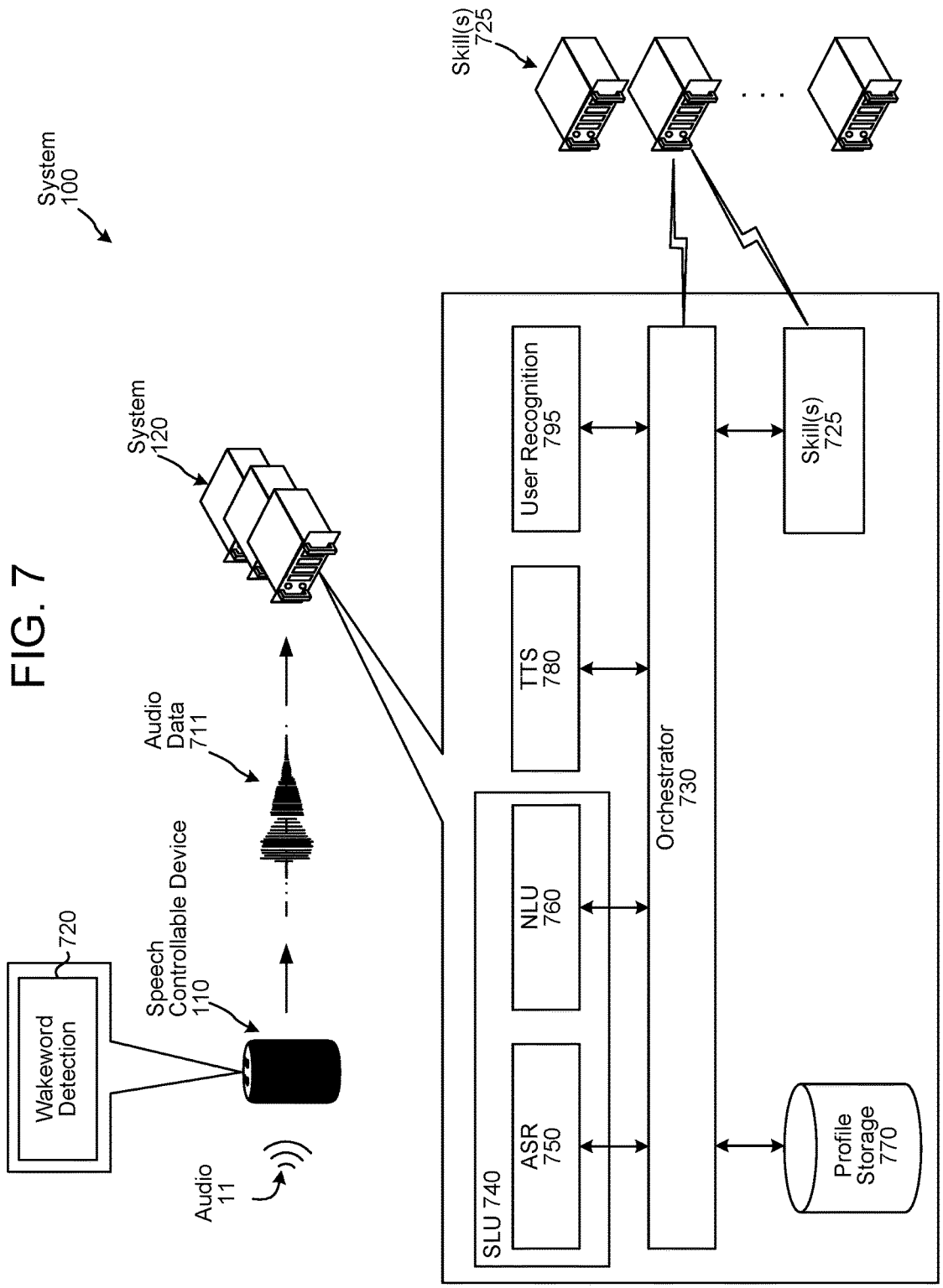
FIG. 7 is a conceptual diagram of components of a system, according to embodiments of the present disclosure.

The system 100 may operate using various components as illustrated in FIG. 7. The various components may be located on a same or different physical devices. Communication between various components may occur directly or across a network(s) 199.

A microphone or array of microphones (of or otherwise associated with the speech controllable device 110) may capture audio 11. The speech controllable device 110 processes audio data, representing the audio 11, to determine whether speech is detected. The speech controllable device 110 may use various techniques to determine whether audio data includes speech. In some examples, the speech controllable device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the speech controllable device 110 may implement a classifier configured to distinguish speech from background noise. The classifier may be implemented by techniques such as linear classifiers, support vector machines, and decision trees. In still other examples, the speech controllable device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the speech controllable device 110 may determine if the speech is directed at the speech controllable device 110/system 120. In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 720 detects a wakeword, the speech controllable device 110 may "wake" and begin transmitting audio data 711, representing the audio 11, to the system 120. The audio data 711 may include data corresponding to the detected wakeword, or the speech controllable device 110 may remove the portion of the audio corresponding to the detected wakeword prior to sending the audio data 711 to the system 120.

The system 120 may include an orchestrator component 730 configured to, among other things, coordinate data transmissions between components of the system 120. The orchestrator component 730 may receive the audio data 711 from the speech controllable device 110, and send the audio data 711 to an ASR component 750.

The ASR component 750 transcribes the audio data 711 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 711. Each ASR hypothesis may be associated with a score representing a confidence of ASR processing performed to determine the ASR hypothesis with which the score is associated.

The ASR component 750 interprets the speech in the audio data 711 based on a similarity between the audio data 711 and pre-established language models. For example, the ASR component 750 may compare the audio data 711 with models for sounds (e.g., subword units, such as phonemes, etc.) and sequences of sounds to identify words that match the sequence of sounds of the speech represented in the audio data 711.

In at least some instances, instead of the speech controllable device 110 receiving audio 11, the speech controllable device 110 may receive a text-based (e.g., typed) natural language input. The speech controllable device 110 may determine text data 713 representing the typed natural language input, and may send the text data 713 to the system 120, wherein the text data 713 is received by the orchestrator component 730. The orchestrator component 730 may send the text data 713 or ASR output data output, depending on the type of natural language input received, to a NLU component 760.

The NLU component 760 processes the ASR output data or text data to determine one or more NLU hypotheses embodied in NLU output data. The NLU component 760 may perform intent classification (IC) processing on the ASR output data or text data to determine an intent of the natural language user input. An intent corresponds to an action to be performed that is responsive to the natural language user input. To perform IC processing, the NLU component 760 may communicate with a database of words linked to intents. For example, a music intent database may link words and phrases such as "quiet," "volume off," and "mute" to a <Mute> intent. The NLU component 760 identifies potential intents by comparing words and phrases in ASR output data or text data to the words and phrases in an intents database. In at least some embodiments, the NLU component 760 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 760 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 760 may be linked to one or more grammar frameworks with "slots" to be filled. Each slot of a grammar framework corresponds to a portion of ASR output data or text data that the NLU component 760 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 760 may perform NER processing to identify words in ASR output data or text data as subject, object, verb, preposition, etc. based on grammar rules and/or models. Then, the NLU component 760 may perform IC processing that involves using the identified verb to identify an intent. Thereafter, the NLU component 760 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 760 may generate NLU output data including one or more NLU hypotheses, with each NLU hypothesis including the intent and slot(s) determined from IC processing and NER processing of the ASR output data or text data. In at least some embodiments, the NLU component 760 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 750 and the NLU component 760). In at least some embodiments, the system 120 may implement a spoken language understanding (SLU) component 755 configured to process audio data 711 to determine NLU output data.

The SLU component 755 may be equivalent to a combination of the ASR component 750 and the NLU component 760. Yet, the SLU component 755 may process audio data 711 and directly determine the NLU output data, without an intermediate step of generating ASR output data. As such, the SLU component 755 may take audio data 711 representing speech and attempt to make a semantic interpretation of the speech. That is, the SLU component 755 may determine a meaning associated with the speech and then implement that meaning. For example, the SLU component 755 may interpret audio data 711 representing speech from the user 5 in order to derive a desired action. The SLU component 755 may output a most likely NLU hypothesis, or multiple NLU hypotheses associated with respective confidence or other scores (such as probability scores, etc.).

The NLU component 760 (or the SLU component 755 depending on configuration of the system 120) may send the NLU output data to the orchestrator component 730. The orchestrator component 730 may send the NLU output data to a skill.

The system 120 may include or otherwise communicate with one or more skills 725. As used herein, a "skill" may refer to software, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill 725 may output music sung by the indicated artist. For further example, for the spoken natural language input "turn on the lights," a skill 725 may cause one or more "smart" lights to operate in an "on" state. In another example, for the spoken natural language input "what is the weather," a skill 725 may output weather information for a geographic location corresponding to the device that captured the spoken natural language input. What is described herein as a skill 725 may be referred to using different terms, such as an action, bot, application, or the like. Inputs to a skill 725 may come from speech processing interactions or through other interactions or input sources.

A skill 725 may be associated with a domain, a non-limiting list of which includes a smart home domain, a music domain, a video domain, a weather domain, a communications domain, a flash briefing domain, a shopping domain, and a custom domain.

The system 120 may include a TTS component 780 that determine audio data (e.g., synthesized speech) from text data using one or more different methods. Text data input to the TTS component 780 may come from a skill, the orchestrator component 730, or another component of the system 120.

In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to determine audio data including an artificial speech waveform. Parametric synthesis uses a computerized voice generator, sometimes called a vocoder.

The system 120 may include a user recognition component 795. The user recognition component 795 may recognize one or more users using various data. The user recognition component 795 may take as input the audio data 711. The user recognition component 795 may perform user recognition by comparing speech characteristics, in the audio data 711, to stored speech characteristics of users (e.g., stored speech characteristics associated with user profile identifiers associated with the speech controllable device 110 that determined the audio data 711). The user recognition component 795 may additionally or alternatively perform user recognition by comparing biometric data (e.g., fingerprint data, iris data, retina data, etc.), received by the system 120 in correlation with a natural language input, to stored biometric data of users (e.g., stored biometric data associated with user profile identifiers associated with the speech controllable device 110 that determined the audio data 711 or otherwise captured a user input). The user recognition component 795 may additionally or alternatively perform user recognition by comparing image data (e.g., including a representation of at least a feature of a user), received by the system 120 in correlation with a natural language input, with stored image data including representations of features of different users (e.g., stored image data associated with user profile identifiers associated with the speech controllable device 110 that determined the audio data 711 or otherwise captured a user input). The user recognition component 795 may perform other or additional user recognition processes, including those known in the art. For a particular user input, the user recognition component 795 may perform processing with respect to stored data of users associated with the speech controllable device 110 that captured the user input.

The user recognition component 795 determines whether a user input originated from a particular user. For example, the user recognition component 795 may determine a first value representing a likelihood that a user input originated from a first user, a second value representing a likelihood that user input originated from a second user, etc. The user recognition component 795 may also determine an overall confidence regarding the accuracy of user recognition processing.

The user recognition component 795 may output a single user profile identifier corresponding to the most likely user that originated the user input. Alternatively, the user recognition component 795 may output multiple user profile identifiers (e.g., in the form of an N-best list) with respective values representing likelihoods of respective users originating the user input. The output of the user recognition component 795 may be used to inform NLU processing, processing performed by a skill, as well as processing performed by other components of the system 120 and/or other systems.

The system 120 may include profile storage 770. The profile storage 770 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 770 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 770 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 770 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

In at least some embodiments, the system 130 may be implemented as part of the system 120. In at least some other embodiments, the system 130 may be separate from but in communication with the system 120, for example over a network(s). For example, the system 130 may send data to and receive data from the orchestrator component 730.

Figure 8:
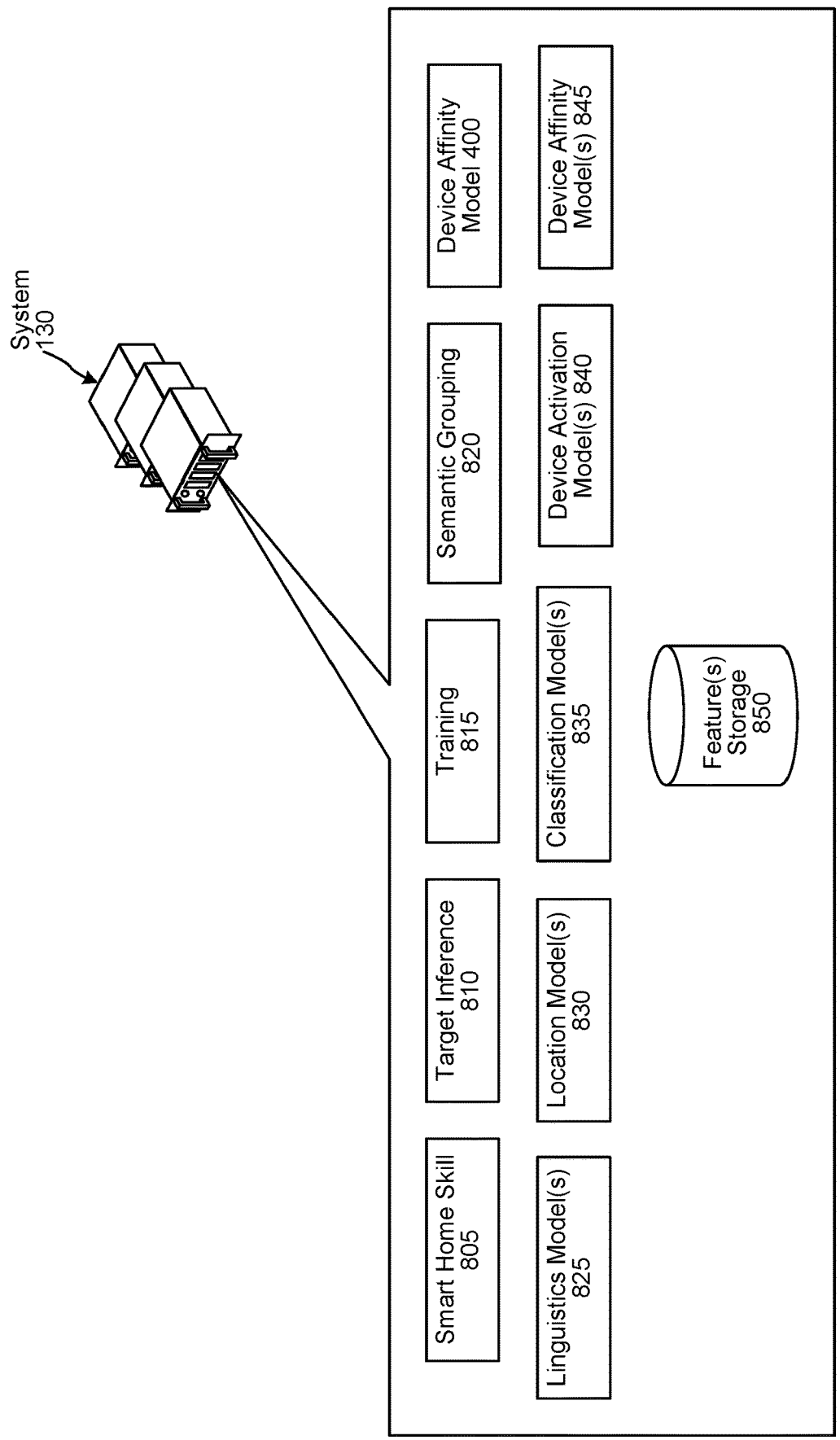
FIG. 8 is a conceptual diagram of components of a system, according to embodiments of the present disclosure.

FIG. 8 is a conceptual diagram of components of the system 130. The system 130 may include a smart home skill 805, a target inference component 810, a training component 815, a semantic grouping component 820, one or more linguistics models 825, one or more location models 830, one or more classification models 835, one or more device activation models 840, one or more device affinity models 845, and a feature(s) storage 850.

The smart home skill 805 may be configured to receive NLU output data and attempt to determine which device 110 is to be controlled. In some instances, the smart home skill 805 may determine more than one device 110 may correspond to a device to be controlled. In such example, the smart home skill 805 may call or otherwise request the target inference component 810 perform target device resolution.

The target inference component 810 may use data stored in the profile storage 770 and/or from audio data representing the spoken natural language input along with one or more models to determine which device 110 should be acted upon. For example, the target inference component 810 may receive data from one or more sources as input into a classification model(s) 835 for determining which device 110 should be acted upon in light of device identifying information in the spoken natural language input. The data may include, for example, names of the devices 110 associated with the speech controllable device that received the spoken natural language input, device-state data indicating historical activation and deactivation of the devices 110, prior-request data indicating which devices 110 were activated and/or deactivated recently, device affinity data indicating frequencies at which devices 110 are controlled by speech controllable devices, current device state data indicating the state of devices 110 at or near the time the spoken natural language input was received, and/or the audio data representing the spoken natural language input.

The one or more models may be configured to use some or all of this data to generate features for input into the classification model(s) 835. For example, the linguistics model(s) 825 may use the device identifying information from the spoken natural language input and the names of the devices 110 to determine semantic similarities for some or all device identifying information/name pairs. The features generated by the linguistics model(s) 825 may include semantic-similarity scores for some or all of the pairs, with the most favorable score being associated with the device name that was determined by the linguistic model(s) 825 to be most semantically similar to the device identifying information from the spoken natural language input. For example, the linguistics model(s) 825 may determine "study light" to have a more favorable similarity score with respect to "office light" than "kitchen light" because "study" and "office" are more semantically similar than "study" and "kitchen." These features may be configured to be input include the classification model(s) 835 and/or may be stored in the feature(s) storage 850 for use by the classification model(s) 835.

As to the linguistics model(s) 825, machine learning techniques may be used to generate models that extract and/or use extracted names associated with the devices 110 and calculate semantic similarities between the names and the device identifying information from the spoken natural language input. A device pair may be identified, determined, and/or generated for each pair of device identifying information and device 110. For example, a first pair may correspond to a first device 110*a* and the device identifying information, a second pair may correspond to a second device 110*b* and the device identifying information, a third pair may correspond to a third device 110*c* and the device identifying information, etc. The names associated with the devices 110 may be analyzed with respect to the device identifying information, using the linguistics model(s) 825, to determine a probability score for each pair.

In addition to, or instead of, using the linguistics model(s) 825, the system 130 may use the device activation model(s) 840 to perform target device resolution. By way of example, the device activation model(s) 840 may use the device-state data and/or the spoken natural language input data to determine probabilities that the devices 110 are operated at the time when the spoken natural language input is received. A probability may be determined for some or all of the devices 110 associated with the speech controllable device that received the spoken natural language input. The features generated by the device activation model(s) 840 may include device activation scores for some or all of the devices 110, with the most favorable score being associated with the device 110 that is most frequently operated during the time and/or within a time range that includes the time at which the spoken natural language input was received.

For example, it may be determined that at or near a certain time of the day and/or day of the week, such as weekdays at 2:00 pm for example, a first device 110*a* with the name "office light" is activated frequently. If a spoken natural language input is received by the system 120 at, for example, 2:04 pm, the device activation model(s) 840 may determine that a higher probability exists that the "office light" device is the device to be acted upon rather than, for example, a "bedroom light" device, which is operated less frequently at or around 2:00 μm. These features may be configured to be input include the classification model(s) 835 and/or may be stored in the feature(s) storage 850 for use by the classification model(s) 835.

As to the device activation model(s) 840, rules-based and/or machine learning techniques may be used to generate models that extract and/or use timing information associated with when a device 110 is turned on and/or turned off. The device activation model(s) 840 may be configured to receive timing data. The timing data may be used to determine when devices 110 are turned on and/or turned off. A threshold degree of usage similarity may be identified and/or determined and may be used to analyze whether a given device has a usage frequency that meets or exceeds the threshold degree of usage similarity.

In addition to, or instead of, using the linguistics model(s) 825 and/or the device activation model(s) 840, the system 130 may use the device affinity model(s) 845 to perform target device resolution. By way of example, the device affinity model(s) 845 may use device affinity data to determine frequencies at which devices 110 are operated by speech controllable devices. For example, some devices 110 may be operated more frequently by one speech controllable device over another speech controllable device, such as devices 110 in an office being operated more frequently by a speech controllable device situated in the office. A frequency and/or score indicating how frequent some or all of the devices 110 are used by some or all of the speech controllable devices 110 may be determined by the device affinity model(s) 845. The features generated by the device affinity model(s) 845 may include device affinity scores, with the most favorable score being associated with the device 110 that is most frequently operated by the speech controllable device from which the spoken natural language input was received. These features may be configured to be input into the classification model(s) 835 and/or may be stored in the feature(s) storage 850 for use by the classification model(s) 835.

As to the device affinity model(s) 845, rules-based and/or machine learning techniques may be used to generate models that extract and/or use device affinity information associated with a frequency at which a device 110 is caused to operate by given speech controllable devices. For example, a physical location may include two or more speech controllable devices, for example one in an office and one in a bedroom. The office speech controllable device may be frequently used to operate certain devices 110, whereas the bedroom speech controllable device may be frequently used to operate other devices 110. The device affinity model(s) 845 may determine a frequency at which such speech controllable devices are used to operate the devices 110. For example, device affinity data may be received by the device affinity model(s) 845 for identifying which devices 110 are operated by which speech controllable devices and frequencies associated with such operations.

A control rate may be identified for each pair of speech controllable device and device 110. For example, a control rate of 0.9 may be determined for the interaction of a first device 110 with a first speech controllable device, a control rate of 0.1 may be determined for the interaction of the first device 110 with a second speech controllable device, a control rate of 0.8 may be determined for the interaction of a second device 110 with the first speech controllable device, a control rate of 0.2 may be determined for the interaction of the second device 110 with the second speech controllable device, etc. In this example, the device affinity model(s) 845 may determine that the first device and the second device are frequently controlled by the first speech controllable device, making those devices candidates for target device resolution when the spoken natural language input is received from the first speech controllable device. In examples, a threshold control rate may be established and may be used to determine if a device 110 is controlled by a particular speech controllable device with enough frequency to make the device 110 a candidate for target device resolution.

In addition to, or instead of, using the linguistics model(s) 825 and/or the device activation model(s) 840 and/or the device affinity model(s) 845, the system 130 may use the location model(s) 830 to perform target device resolution. For example, the location model(s) 830 may use the device identifying information from the spoken natural language input to determine if the device identifying information corresponds to an environment naming, such as "kitchen," "office," "living room," etc. The features generated by the location model(s) 830 may include confidence scores associated with environment names, with the most favorable score being associated with the environment name that most closely corresponds to the device identifying information. For example, if the spoken natural language input includes "turn on the kitchen lights," the location model(s) 830 may identify "kitchen" as the device identifying information and may use that information to determine which device 110 associated with the "kitchen" and/or with a name of "kitchen" is most likely to correspond to "kitchen lights" from the spoken natural language input. Additionally, or alternatively, the location model(s) 830 may be configured to receive weather data indicating weather conditions at or near a location where the speech controllable device and/or the devices 110 are situated. The weather data may be used to determine, for example, lighting conditions at the location and/or within a given space. For example, in instances where the weather data indicates that it is currently sunny and 95 degrees at the location, it may be less likely that the spoken natural language input corresponds to a request to turn on lights in a living room area. For further example, in instances where the weather data indicates it is currently cloudy and/or rainy, it may be more likely that the spoken natural language input corresponds to a request to turn on lights in a living room area.

Additionally, or alternatively, the system 130 may be configured to use prior request data to generate features that include prior request scores. For example, multiple devices 110 may be associated with a speech controllable device, and the prior request data may indicate a time at which a given device 110 was operated in response to a spoken natural language input. The device 110 that was operated closest in time to when the spoken natural language input was received may be more likely to correspond to the target device than other devices 110. For example, a previous spoken natural language input may have been "turn on bedroom light." Thereafter, another spoken natural language input received 10 minutes later may be "turn off light." The prior request data may indicate the time at which the bedroom light was turned on, and upon receiving the spoken natural language input of "turn off light," the system 130 may determine a prior request score as a feature for input into the classification model(s) 835.

Additionally, or alternatively, the system 130 may be configured to use current device state to generate features that include device state scores. For example, devices 110 may be associated with states, such as "on," "off," "idle," "active," etc. A spoken natural language input may include "turn off the light." In this example, the intent may be to deactivate or otherwise turn off a device 110, but device identifying information was not provided in the spoken natural language input. However, only a portion or only one device 110 may be in a state that is "on" or similar, and this information can be used by the system 130 to determine that other devices 110 that are already in an "off" state are not likely candidates for target device resolution. Device state scores may be determined by the system 130 as features for input into the classification model(s) 835.

Additionally, or alternatively, the semantic grouping component 820 may be configured to use the device identifying information from the spoken natural language input to determine semantic similarities and affinities to identify the device 110 most likely to correspond to the device identifying information, even in instances where the name for the device 110 has not been setup by the user and/or is associated with a default name, such as "light A," for example. For example, a spoken natural language input may include "turn on cooking lights," but the speech controllable device, that received the spoken natural language input, is not associated with a device 110 with the name of "cooking lights." The semantic grouping component 820 may determine a semantic similarity between the word "cooking" and one or more words from names typically used for devices 110. For example, the system 130 may determine that "cooking" is semantically similar to "kitchen." The system 130 may then determine similarities between the semantically-similar word, here "kitchen," and device group names and/or names for speech controllable devices.

For example, the user may have assigned or otherwise selected "kitchen" as a name for a device group that includes devices 110 located in the kitchen associated with the user, and/or the user may have assigned or otherwise selected "kitchen" as a name for the speech controllable device. Additionally, or alternatively, usage data aggregated from use of speech controllable devices in one or more other spaces may be used to determine that "cooking light" frequently refers to a device 110 with a "light" device type that is generally given a name with the word "kitchen." Some or all of this information may be used by the semantic grouping component 820 to determine that the device 110 with the default name "light A," which is associated with the "kitchen" device group, and/or is associated with the "kitchen" speech controllable device, and/or that is associated with the usage data may be given the name "kitchen light," and may be acted upon in response to the spoken natural language input "turn on cooking light."

The features generated by the linguistics model(s) 825, the device activation model(s) 840, the device affinity model(s) 845, the location model(s) 830, and/or the semantic grouping component 820 may be stored, in examples, in a feature(s) storage 850 and may be retrieved by the classification model(s) 835 to perform target device resolution. For example, device affinity scores may be predetermined before the spoken natural language input is received, and the corresponding features may be stored in the feature(s) storage 850.

In examples, the target inference component 810 may be unable to determine which device 110 should be acted upon in light of the spoken natural language input and/or may be able to determine which device 110 should be acted upon below a threshold confidence level. In these and other examples, the process may default to identifying the device 110 using Levenshtein distances. Levenshtein distances may include a string metric for measuring the distance between two sequences. For example, the Levenshtein distance between two words is the minimum number of single-character edits required to change one word into the other. These techniques may be used to determine the Levenshtein distance between device identifying information from the spoken natural language input and names associated with devices 110, with the shortest Levenshtein distance indicating the names to be selected by the system 130.

Based at least in part on the features as described herein, the classification model(s) 835 may determine which device (s) 110 is most likely to correspond to the device(s) intended to be acted upon. For example, the classification model(s) 835 may generate output data representing a ranked list of the devices 110, with the highest ranking device 110 being the most likely device to be acted upon. The target inference component 810 may provide the name and/or device identifier of the highest ranking device 110 to the smart-home skill 805, for example, to generate directive data. The directive data may represent a directive for the speech controllable device and/or other components of the system 130 to perform a directive, such as activation and/or deactivation, on the highest-ranking device 110. Additionally, or alternatively, the TTS component 780 may generate audio data representing a request for the user of the speech controllable device to confirm that the identified device 110 is the device the user intended for the system 130 to act upon. Audio data representing the response of the user may be received at the system 120 for processing, and if the response confirms that the device 110 was selected accurately by the system 130, the directive data may be sent to the speech controllable device.

Additionally, or alternatively, user responses to the target device resolution processes described herein may be used by the training component 815 to train the one or more models of the system 130 and/or to generate new models to be used for target device resolution. The training component 815 may receive feedback data representing an indication that the target device corresponds to a given device 110 and may generate, based at least in part on the feedback data, training data representing the indication as a target attribute. The training component 815 may determine an association between the target attribute and at least one of the features or at least a portion of intent data as generated by the NLU component 760, and may generate, based at least in part on the association, a new classification model(s) to be used in place of the previous classification model(s) 835.

Figure 9:
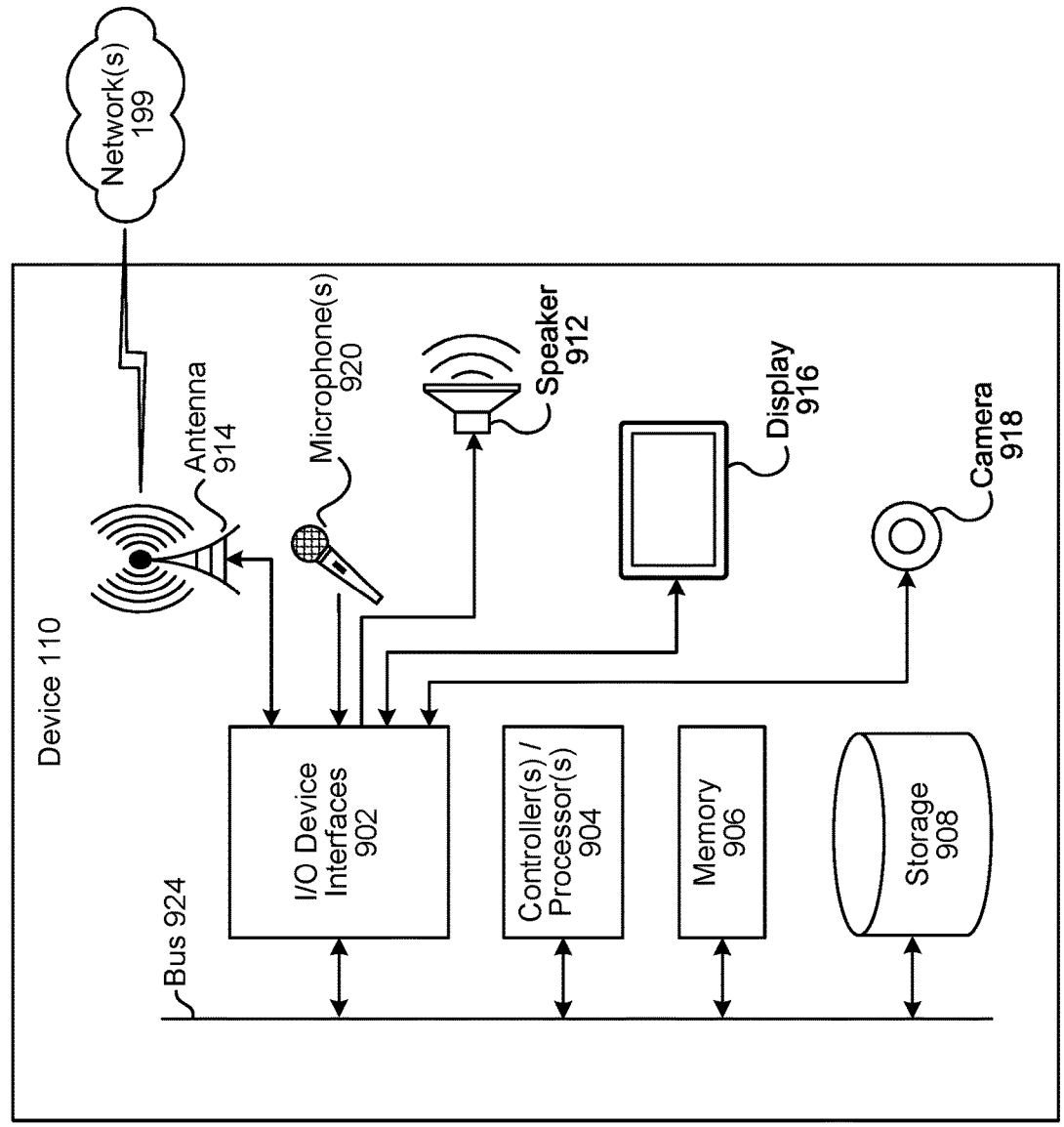
FIG. 9 is a block diagram conceptually illustrating example components of a device, according to embodiments of the present disclosure.
Figure 10:
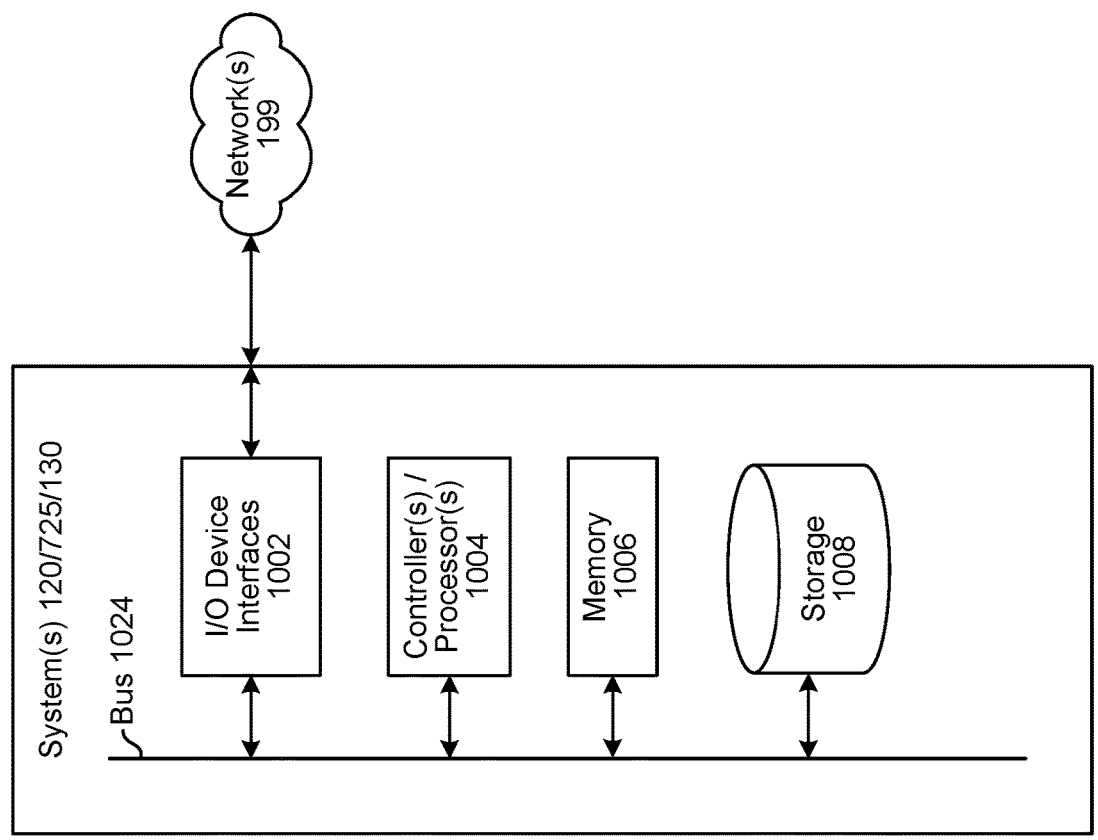
FIG. 10 is a block diagram conceptually illustrating example components of a system, according to embodiments of the present disclosure.

FIG. 9 is a block diagram conceptually illustrating a device 110 that may be used with the system 120. FIG. 10 is a block diagram conceptually illustrating example components of a remote device, such as the system 120, a skill 725, and the system 130. A system (120/725/130) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/725/130) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/725/130) may be included in the system 100 of the present disclosure, such as one or more systems 120 for performing ASR processing, one or more systems 120 for performing NLU processing, one or more skill 725, one or more systems 130, etc. In operation, each of these systems may include computer-readable and computer-executable instructions that reside on the respective device (120/725/130), as will be discussed further below.

Each of these devices (110/120/725/130) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/725/130) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/725/130) may also be connected to removable or external non-volatile memory and/or storage (such as a removable memory card, memory key drive, networked storage, etc.) through respective input/output device interfaces (902/1002).

Computer instructions for operating each device (110/120/725/130) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/725/130) includes input/output device interfaces (902/1002). A variety of components may be connected through the input/output device interfaces (902/1002), as will be discussed further below. Additionally, each device (110/120/725/130) may include an address/data bus (924/1024) for conveying data among components of the respective device. Each component within a device (110/120/725/130) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, the skill 725, and/or the system 130 may include their own dedicated processors, memory, and/or storage. Alternatively, one or more of the components of the device 110, the system 120, the skill 725, and/or the system 130 may utilize the I/O interfaces (902/1002), processor(s) (904/1004), memory (906/1006), and/or storage (908/1008) of the device 110, the system 120, the skill 725, or the system 130, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, the skill 725, and the system 130, as described herein, are illustrative, and may be located as a stand-alone device or may be included, in whole or in part, as a component of a larger device or system.

Figure 11:
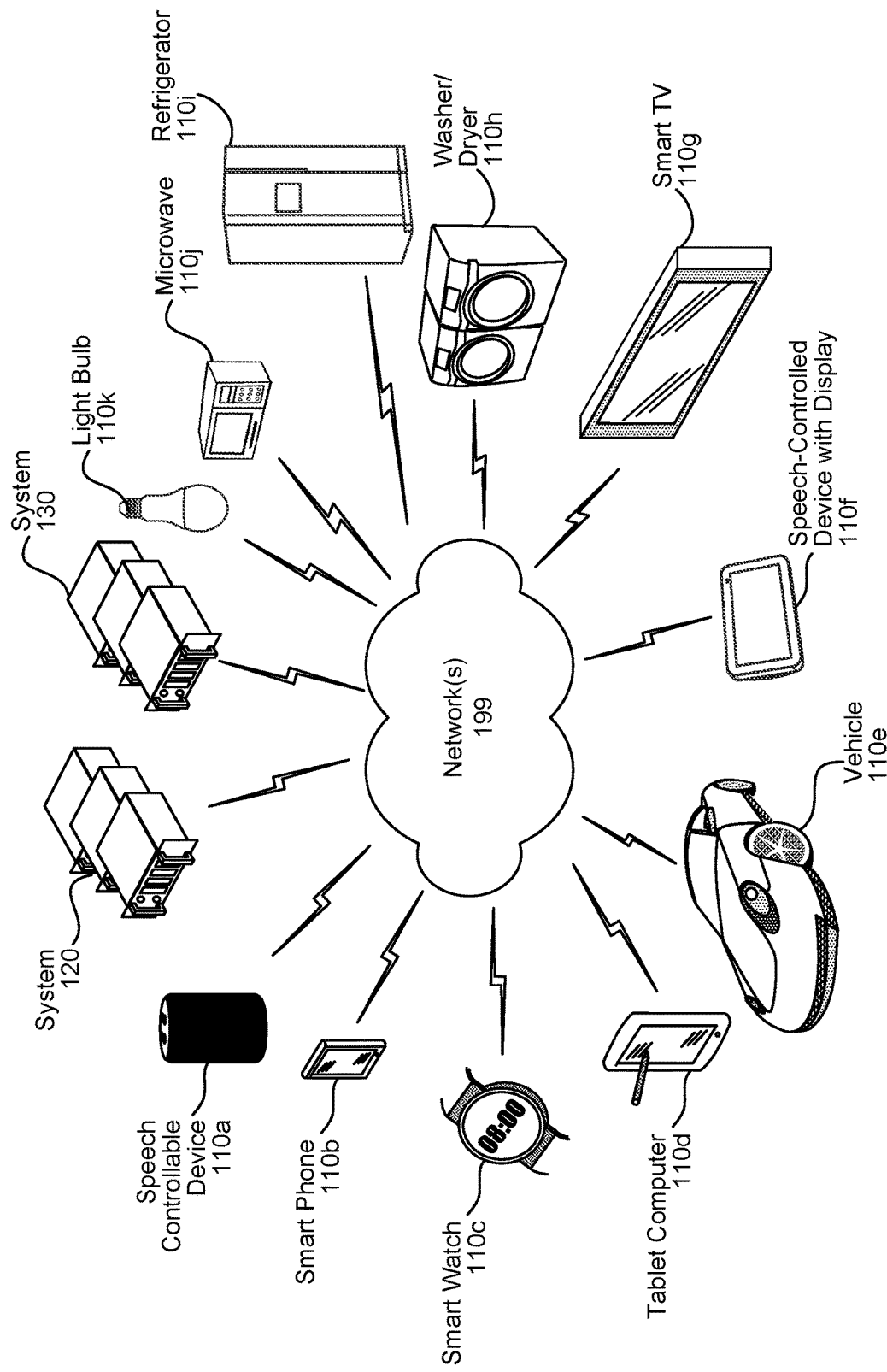
FIG. 11 illustrates an example of a computer network for use with the overall system, according to embodiments of the present disclosure.

As illustrated in FIG. 11, multiple devices (110a-110k, 120, 130) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, a microwave 110j, and/or a light bulb 110k may be connected to the network(s) 199 through a wireless service provider, over a Wi-Fi or cellular network connection, or the like. Other devices are included as network-connected support devices, such as the system 120, the system 130, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving a first device identifier representing a first device connected to a first wireless router, the first device identifier being associated with a first user profile identifier;
   receiving a second device identifier representing a second device connected to the first wireless router, the second device identifier being associated with a second user profile identifier;
   based on determining the first device and the second device are both connected to the first wireless router, determining processing is to be performed to determine whether the first device and the second device are to be represented in a single group of devices;
   after determining the processing is to be performed, determining a third device identifier associated with the first user profile identifier;
   determining first device profile data associated with the first device identifier;
   determining second device profile data associated with the second device identifier;
   determining third device profile data associated with the third device identifier;
   determining a first output data representing a first cosine similarity between the first device profile data and the second device profile data;
   determining a second output data representing a second cosine similarity between the third device profile data and the second device profile data;

based on the first output data and the second output data, determining the first device identifier, the second device identifier, and the third device identifier are to be represented in a group of device identifiers associated with a physical location; and storing first data associating the first device identifier, the second device identifier, and the third device identifier.

2. The computer-implemented method of claim 1, further comprising:

determining a first internet protocol (IP) address associated with the first device identifier;

determining a second IP address associated with the second device identifier;

determining a number of digits that are similar between the first IP address and the second IP address; and further based on the number of digits, determining the first device identifier, the second device identifier, and the third device identifier are to be represented in the group of device identifiers.

3. The computer-implemented method of claim 1, further comprising:

receiving, from the first device, audio data representing a spoken natural language input;

processing the audio data to determine the spoken natural language input requests a device perform first processing, the spoken natural language input including a device name;

determining the device name is unassociated with the first user profile identifier;

determining the device name is associated with the second user profile identifier; and based on the device name being associated with the second user profile identifier, determining the first output data.

4. The computer-implemented method of claim 1, further comprising:

based on the first output data and the second output data, determining a distribution of cosine similarities; and using a machine learning model, processing the distribution of cosine similarities to determine the first device identifier, the second device identifier, and the third device identifier are to be represented in the group of device identifiers.

5. A computer-implemented method comprising:

receiving a first device identifier representing a first device, the first device identifier being associated with a first user profile identifier;

determining a second device identifier representing a second device, the second device identifier being associated with a second user profile identifier;

determining first device profile data associated with the first device identifier;

determining second device profile data associated with the second device identifier;

determining a first similarity between the first device profile data and the second device profile data;

based at least in part on the first similarity, determining the first device identifier and the second device identifier are to be represented in a group of device identifiers; and storing first data associating the first device identifier and the second device identifier.

6. The computer-implemented method of claim 5, further comprising:

determining a third device identifier associated with the first user profile identifier;

determining third device profile data associated with the third device identifier;

determining a second similarity between the third device profile data and the second device profile data;

further based at least in part on the second similarity, determining the first device identifier and the second device identifier are to be represented in a group of device identifiers; and storing the first data to associate the first device identifier, the second device identifier, and the third device identifier.

7. The computer-implemented method of claim 6, further comprising:

based on the first similarity and the second similarity, determining a distribution of similarities; and using a machine learning model, processing the distribution of similarities to determine the first device identifier, the second device identifier, and the third device identifier are to be represented in the group of device identifiers.

8. The computer-implemented method of claim 5, further comprising:

determining a first internet protocol (IP) address associated with the first device identifier;

determining a second IP address associated with the second device identifier;

determining a second similarity between the first IP address and the second IP address; and further based on the second similarity, determining the first device identifier and the second device identifier are to be represented in the group of device identifiers.

9. The computer-implemented method of claim 5, further comprising:

receiving, from the first device, audio data representing a spoken natural language input;

processing the audio data to determine the spoken natural language input requests a device perform first processing, the spoken natural language input including a device name;

determining the device name is unassociated with the first user profile identifier;

determining the device name is associated with the second user profile identifier; and based on the device name being associated with the second user profile identifier, determining the first similarity.

10. The computer-implemented method of claim 5, further comprising:

determining the first device identifier is associated with a network device;

determining the second device identifier is associated with the network device; and based on the first device identifier and the second device identifier both being associated with the network device, determining the first similarity.

11. The computer-implemented method of claim 5, further comprising:

determining a third device identifier associated with the first user profile identifier;

determining a fourth device identifier associated with the first user profile identifier;

determining third device profile data associated with the third device identifier;

determining fourth device profile data associated with the fourth device identifier;

determining a second similarity between the third device profile data and the fourth device profile data;

based at least in part on the second similarity, determining the third device identifier and the fourth device identifier are to be represented in different groups of device identifiers;
storing second data associating the third device identifier and a first device group identifier; and
storing third data associating the fourth device identifier with a second device group identifier.

12. The computer-implemented method of claim 5, further comprising:
determining a first device group identifier associated with:
a third device identifier associated with the first user profile identifier; and
a fourth device identifier associated with a third user identifier;
after determining the first device group identifier is associated with the third device identifier and the fourth device identifier, determining:
the third device identifier is associated with a first network device; and
the fourth device identifier is associated with a second network;
determining third device profile data associated with the third device identifier;
determining fourth device profile data associated with the fourth device identifier;
determining a second similarity between the third device profile data and the fourth device profile data;
based at least in part on the second similarity, determining the third device identifier and the fourth device identifier are to be represented in different groups of device identifiers; and
deleting second data associating the fourth device identifier with the first device group identifier.

13. A computing system comprising:
at least one processor; and
at least one memory comprising instructions that, when executed by the at least one processor, cause the computing system to:
receive a first device identifier representing a first device, the first device identifier being associated with a first user profile identifier;
determine a second device identifier representing a second device, the second device identifier being associated with a second user profile identifier;
determine first device profile data associated with the first device identifier;
determine second device profile data associated with the second device identifier;
determine a first similarity between the first device profile data and the second device profile data;
based at least in part on the first similarity, determine the first device identifier and the second device identifier are to be represented in a group of device identifiers; and
store first data associating the first device identifier and the second device identifier.

14. The computing system of claim 13, wherein the at least one memory further comprises instructions that, when executed by the at least one processor, further cause the computing system to:
determine a third device identifier associated with the first user profile identifier;
determine third device profile data associated with the third device identifier;
determine a second similarity between the third device profile data and the second device profile data;
further based at least in part on the second similarity, determine the first device identifier and the second device identifier are to be represented in a group of device identifiers; and
store the first data to associate the first device identifier, the second device identifier, and the third device identifier.

15. The computing system of claim 14, wherein the at least one memory further comprises instructions that, when executed by the at least one processor, further cause the computing system to:
based on the first similarity and the second similarity, determine a distribution of similarities; and
using a machine learning model, process the distribution of similarities to determine the first device identifier, the second device identifier, and the third device identifier are to be represented in the group of device identifiers.

16. The computing system of claim 13, wherein the at least one memory further comprises instructions that, when executed by the at least one processor, further cause the computing system to:
determine a first internet protocol (IP) address associated with the first device identifier;
determine a second IP address associated with the second device identifier;
determine a second similarity between the first IP address and the second IP address; and
further based on the second similarity, determine the first device identifier and the second device identifier are to be represented in the group of device identifiers.

17. The computing system of claim 13, wherein the at least one memory further comprises instructions that, when executed by the at least one processor, further cause the computing system to:
receive, from the first device, audio data representing a spoken natural language input;
process the audio data to determine the spoken natural language input requests a device perform first processing, the spoken natural language input including a device name;
determine the device name is unassociated with the first user profile identifier;
determine the device name is associated with the second user profile identifier; and
based on the device name being associated with the second user profile identifier, determine the first similarity.

18. The computing system of claim 13, wherein the at least one memory further comprises instructions that, when executed by the at least one processor, further cause the computing system to:
determine the first device identifier is associated with a network device;
determine the second device identifier is associated with the network device; and
based on the first device identifier and the second device identifier both being associated with the network device, determine the first similarity.

19. The computing system of claim 13, wherein the at least one memory further comprises instructions that, when executed by the at least one processor, further cause the computing system to:
determine a third device identifier associated with the first user profile identifier;
determine a fourth device identifier associated with the first user profile identifier;

determine third device profile data associated with the third device identifier;
determine fourth device profile data associated with the fourth device identifier;
determine a second similarity between the third device profile data and the fourth device profile data;
based at least in part on the second similarity, determine the third device identifier and the fourth device identifier are to be represented in different groups of device identifiers;
store second data associating the third device identifier and a first device group identifier; and
store third data associating the fourth device identifier with a second device group identifier.

20. The computing system of claim 13, wherein the at least one memory further comprises instructions that, when executed by the at least one processor, further cause the computing system to:
determine a first device group identifier associated with:
a third device identifier associated with the first user profile identifier; and
a fourth device identifier associated with a third user identifier;
after determining the first device group identifier is associated with the third device identifier and the fourth device identifier, determine:
the third device identifier is associated with a first network device; and
the fourth device identifier is associated with a second network;
determine third device profile data associated with the third device identifier;
determine fourth device profile data associated with the fourth device identifier;
determine a second similarity between the third device profile data and the fourth device profile data;
based at least in part on the second similarity, determine the third device identifier and the fourth device identifier are to be represented in different groups of device identifiers; and
delete second data associating the fourth device identifier with the first device group identifier.

* * * * *